(12) United States Patent
Ohata et al.

(10) Patent No.: US 8,225,370 B2
(45) Date of Patent: Jul. 17, 2012

(54) DIGITAL BROADCAST SIGNAL PROCESSING APPARATUS AND DIGITAL BROADCAST SIGNAL PROCESSING METHOD

(75) Inventors: Tadahiro Ohata, Kanagawa (JP); Keiko Abe, Kanagawa (JP); Yasushi Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1838 days.

(21) Appl. No.: 09/903,014

(22) Filed: Jul. 11, 2001

(65) Prior Publication Data

US 2002/0045987 A1    Apr. 18, 2002

(30) Foreign Application Priority Data

Jul. 13, 2000  (JP) .................................. 2000-213256

(51) Int. Cl.
*H04N 7/16*    (2011.01)
(52) U.S. Cl. ............ 725/139; 725/47; 725/110; 725/42; 725/105; 348/157; 342/457
(58) Field of Classification Search .................... 725/25, 725/93, 100, 187, 170; 348/207.1, 211.1, 348/211.2, 211.3, 211.11, 137, 139, 142, 348/143, 148
See application file for complete search history.

(56) References Cited

U.S. PATENT DOCUMENTS

| | | | |
|---|---|---|---|
| 3,890,463 A * | 6/1975 | Ikegami et al. ................ 348/157 |
| 4,849,817 A * | 7/1989 | Short ....................... 375/240.01 |
| 5,696,706 A * | 12/1997 | Morton et al. ................. 702/142 |
| 5,745,126 A | 4/1998 | Jain et al. |
| 5,894,320 A | 4/1999 | Vancelette |
| 5,940,073 A * | 8/1999 | Klosterman et al. .......... 715/721 |
| 6,020,851 A * | 2/2000 | Busack ......................... 342/457 |
| 6,195,090 B1 * | 2/2001 | Riggins, III ................... 725/139 |
| 6,544,121 B2 * | 4/2003 | DeWeese et al. ............... 463/30 |
| 6,608,649 B2 * | 8/2003 | Suzuki et al. ............... 348/211.8 |
| 6,889,384 B1 * | 5/2005 | Soloff ........................... 725/105 |
| 6,990,681 B2 * | 1/2006 | Wang et al. ................... 725/105 |
| 7,100,117 B1 * | 8/2006 | Chwa et al. ................... 715/763 |
| 7,106,360 B1 * | 9/2006 | Frederick ...................... 348/157 |
| 2001/0042105 A1 * | 11/2001 | Koehler et al. ............... 709/217 |
| 2002/0010931 A1 * | 1/2002 | Chew et al. ..................... 725/42 |
| 2002/0090217 A1 * | 7/2002 | Limor et al. .................. 396/429 |
| 2004/0010804 A1 * | 1/2004 | Hendricks et al. ............ 725/110 |
| 2005/0198668 A1 * | 9/2005 | Yuen et al. ...................... 725/47 |

FOREIGN PATENT DOCUMENTS

| | | |
|---|---|---|
| JP | 10 42282 | 2/1998 |
| WO | WO 98 54896 | 12/1998 |
| WO | WO 00 28731 | 5/2000 |

* cited by examiner

*Primary Examiner* — Scott Beliveau
*Assistant Examiner* — Christine Kurien
(74) *Attorney, Agent, or Firm* — Frommer Lawrence & Haug LLP; William S. Frommer; Thomas F. Presson

(57) ABSTRACT

A digital broadcast signal processing apparatus for multiplexing on a digital broadcast signal any combination of the GPS position information of a movable body, mapping information generated by the mapping of the position information of the movable body and/or the position information of an imaging apparatus on a map, imaging area information by the imaging apparatus, object information by the imaging apparatus, and the profile information concerning the movable body, and transmitting the multiplexed signal.

21 Claims, 12 Drawing Sheets

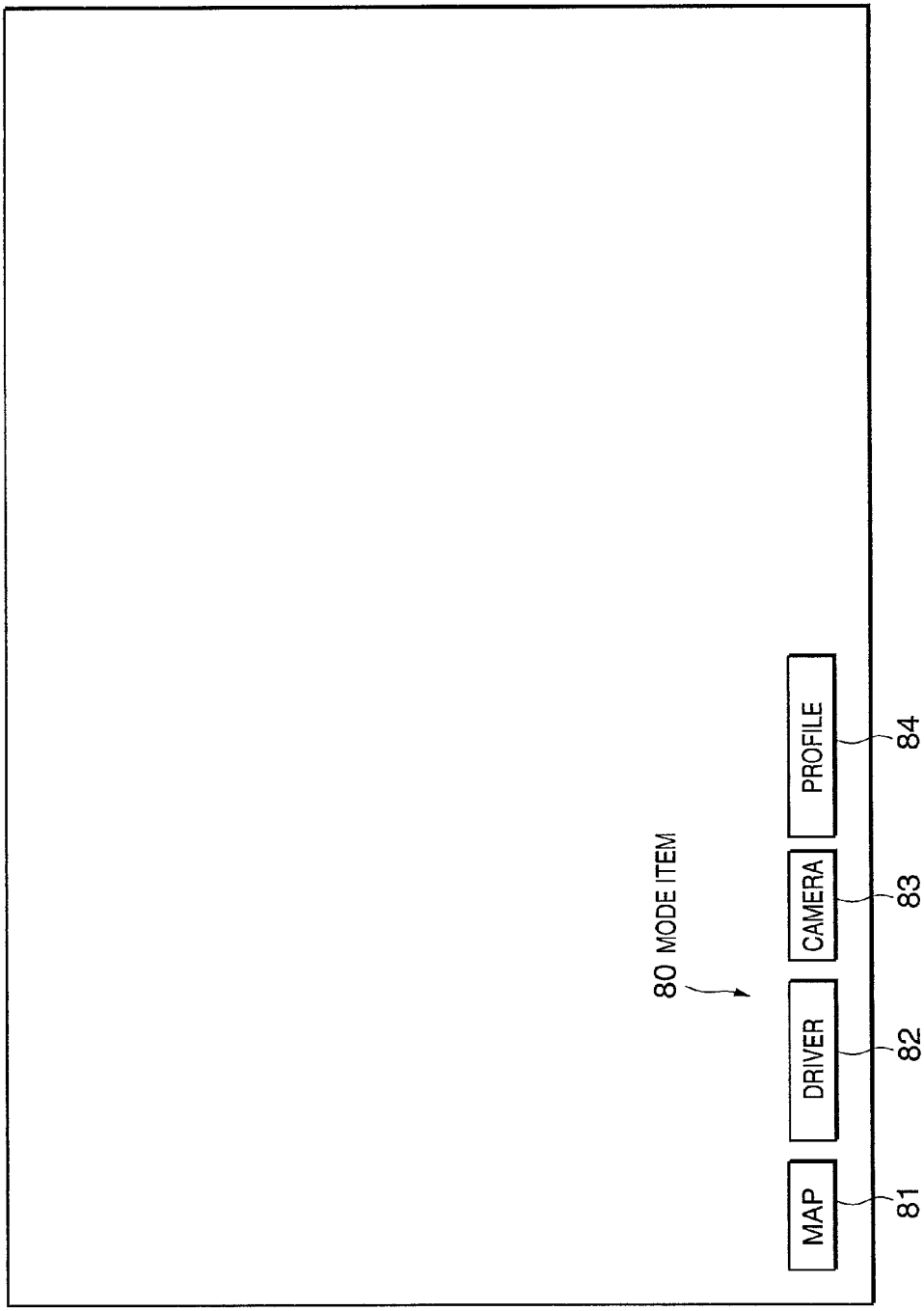

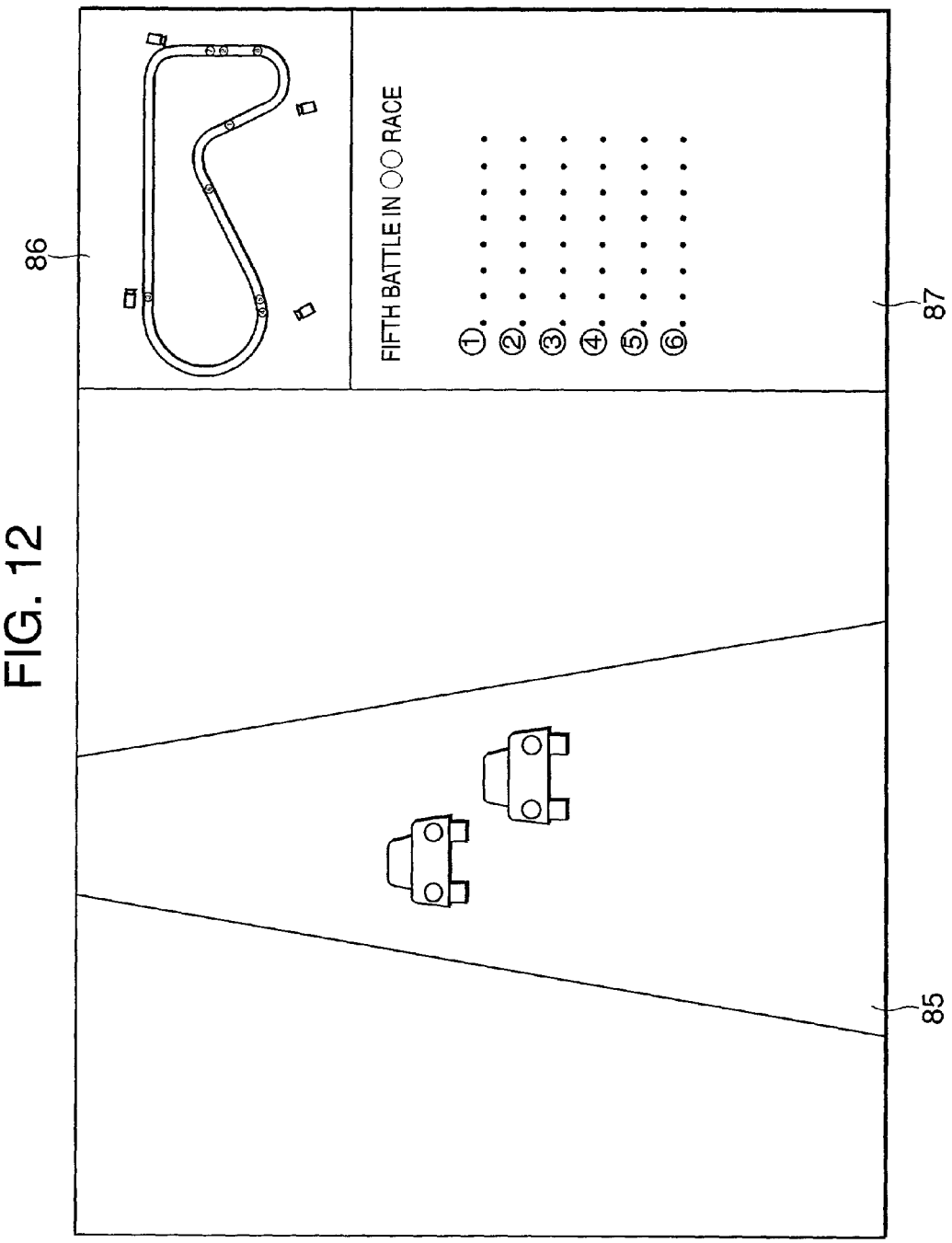

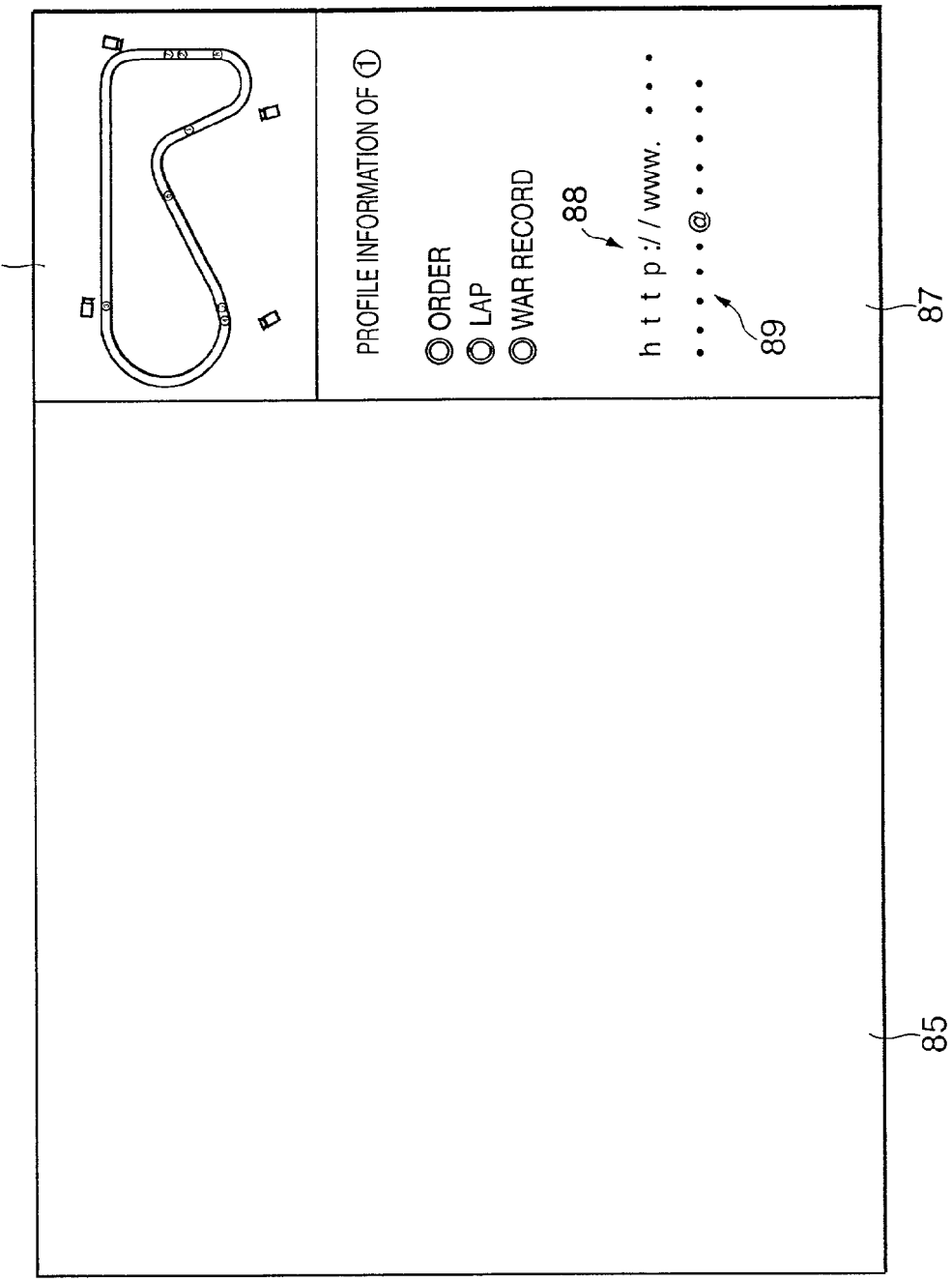

DIGITAL BROADCAST SIGNAL PROCESSING APPARATUS AND DIGITAL BROADCAST SIGNAL PROCESSING METHOD

BACKGROUND OF THE INVENTION

1. Field of the Invention

The present invention relates to a digital broadcast signal processing apparatus. Furthermore, the present invention relates to a digital broadcast signal processing method.

2. Description of the Related Art

At present, the practice of a digital broadcast system is scheduled. The digital broadcast system is a system in which television signals (picture signals and sound signals) are compressed by means of a data compression coding technique (e.g. a moving picture experts group (MPEG) system), and the compressed signals are transmitted in the form of multiplex transmission by means of a data multiplexing technique.

In the digital broadcast system, television signals coded in conformity with a compression coding are divided into packet data in a data form called as a transport stream (TS) (hereinafter, the packet in the data form is referred to as a "TS packet"), and the packet data are multiplexed and thereby the multiplexing of a plurality of channels of television signals to one channel may be realized. Accordingly, if a plurality of channels were to be used for one program, a plurality of television signals that are different in their imaging positions and imaging angles from each other may simultaneously be broadcasted. Because viewers may freely select image sensing apparatus (channels in concrete terms) in the simultaneous broadcasting, the digital broadcast system is expected to improve the freedom of the selection of viewers remarkably.

SUMMARY OF THE INVENTION

Now, in a program in which objects move such as an event program or a sport program, or in a program in which objects are dispersed in a wide area such as a sport event broadcasting program (e.g. a marathon race, a swimming race and a combat sport), a motor sport (e.g. an automobile, a motor bicycle and a bicycle), horse racing, water sports (e.g. a yachchase, a boachase and diving), an outdoor broadcasting program of a concert, and a reporting program at the scene (e.g. a case where reporters are objects), it is desirable that the information concerning which camera is imaging where, and concerning which camera is imaging what or who, and further concerning positions of those objects in the scene are supplied to a viewer side for the full utilization of the selection right of the viewer. Moreover, it is desirable that such information is provided to the viewer side not only for the switching of channels but also for making it possible for the viewer to grasp the situation of the scene more precisely.

For resolving such a problem, the present invention proposes the following means.

(1) We propose a digital broadcast signal processing apparatus comprising: a memory section for storing a GPS position information (latitude, longitude, and including altitude as the need arises) received from a movable body (a person, an animal, a vehicle, a vessel and the like); and a multiplex processing section for multiplexing the GPS position information on a digital broadcast signal of a corresponding program.

The above-described digital broadcast signal processing apparatus includes not only a communication apparatus but also a recording apparatus and an editing apparatus. It is also applicable in the digital broadcast signal processing apparatus which will be described in the following items (2)-(14).

The above-described digital broadcast signal of a corresponding program may be a ground wave including not only a radio broadcast wave but also a wired broadcast wave or a satellite wave. The broadcast form thereof is not only a simultaneous broadcast form in which a plurality of channels are used for one program but also a broadcast form in which one channel is used for one program. The broadcast also includes a storage-type data delivery.

According to the digital broadcast signal processing apparatus, it becomes possible to execute a process of mapping the position of a movable body on map or a process of chasing a movable body on a viewer side or a secondary user side (a secondary station apparatus side such as a storage-type service provider, a center station that receives the supply of picture images from a local station or the scene, or the like).

The mapping information is information relating to a map and a location of the movable object on the map. Such information may be graphic data indicating both the map and the object location, or graphic data indicating only the map and numerical data indicating the object location with respect to the map area, or so-called map data indicating position and attribute information of each map element composing the map and graphic/numerical data regarding the object location.

Incidentally, the digital broadcast signal processing apparatus may be used as a primary station side apparatus that generates and outputs a digital broadcast signal using, for example, a picture signal or a sound signal at the scene or those obtained from the scene. But it does not matter where the place at which the process of multiplexing the mapping information on the digital broadcast signal is performed, so, the digital broadcast signal processing apparatus may be used as a secondary station side apparatus that adds information to a digital broadcast signal received from an another digital broadcast signal processing apparatus to deliver the signal.

(2) We propose a digital broadcast signal processing apparatus comprising: a mapping processing section for mapping a position information on a map on the basis of GPS position information received from the movable body; and a multiplex processing section for multiplexing a mapping information generated by the mapping processing section on a digital broadcast signal.

The map of the mapping processing section may include not only a map stored in a map database but also a simplified map produced by a computer graphic processing.

The digital broad cast signal may be a ground wave including not only a radio broadcast wave but also a wired broadcast wave or a satellite wave. The broadcast form thereof is not only a simultaneous broadcast form in which a plurality of channels are used for one program but also a broadcast form in which one channel is used for one program. The broadcast also includes a storage-type data delivery.

According to the digital broadcast signal processing apparatus, it becomes possible to reduce the processing load for mapping the position of a movable body on map on a viewer side or a secondary user side (e.g. a storage-type service provider or a center station that receives the supply of images from an outside broadcast van at the scene or a local station). It is needless to say that it becomes remarkably easy for a viewer to grasp the positional relation of a movable body because it is made to be possible to supply the mapping information. Incidentally, if the digital broadcast signal processing apparatus is configured to display also the moving direction of the movable body, it becomes easier for a viewer to grasp the direction of movement of the movable body.

Incidentally, the digital broadcast signal processing apparatus may be used as a primary station side apparatus that generates and outputs a digital broadcast signal from, for example, a picture signal or a sound signal at the scene or those obtained from the scene. But it does not matter where the place at which the process of multiplexing the mapping information on the digital broadcast signal is performed, so, the digital broadcast signal processing apparatus may also be used as a secondary station side apparatus that adds information to a digital broadcast signal received from an another digital broadcast signal processing apparatus to deliver the signal.

(3) We propose a digital broadcast signal processing apparatus, wherein the mapping processing section according to the aforesaid item (2) maps a position information of an imaging apparatus on the map according to the GPS position information of the imaging apparatus, together with the position information of the movable body.

The imaging apparatus may be a camera, a video apparatus, or other imaging apparatus.

The map may include not only a map stored in a map database but also a simplified map produced by a computer graphic process.

According to the digital broadcast signal processing apparatus, it becomes possible to reduce the processing load for mapping these positions to map information on a viewer side or a secondary user side (e.g. a storage-type service provider or a center station that receives the supply of images from an outside broadcast van at the scene). It is needless to say that it becomes remarkably easy for a viewer to grasp the positional relation of a movable body and an imaging camera because it is made to be possible to supply the mapping information.

Incidentally, if the digital broadcast signal processing apparatus is configured to display also the imaging direction of the imaging apparatus, a viewer can easily estimate which movable body enters into the imaging area of an imaging apparatus at a specific point. Now, if the digital broadcast signal processing apparatus is configured to display also the moving direction of a movable body, the aforesaid estimation may become easier.

Incidentally, the digital broadcast signal processing apparatus may be used as a primary station side apparatus that generates and outputs a digital broadcast signal from a picture signal or a sound signal at the scene or those obtained from the scene. But it does not matter where the place at which the process of the multiplexing the mapping information on the digital broadcast signal is performed, so, the digital broadcast signal processing apparatus maybe used as a secondary station side apparatus that adds information to a digital broadcast signal received from an another digital broadcast signal processing apparatus to deliver the signal.

(4) We propose a digital broadcast signal processing apparatus comprising: a mapping processing section for mapping a position information of an imaging apparatus on a map according to the GPS position information of the imaging apparatus; and a multiplex processing section for multiplexing mapping information generated by the mapping processing section on a digital broadcast signal.

The digital broad cast signal may be a ground wave (including not only a radio broadcast wave but also a wired broadcast wave) or a satellite wave. The broadcast form thereof is not only a simultaneous broadcast form in which a plurality of channels are used for one program but also a broadcast form in which one channel is used for one program. The broadcast also includes a storage-type data delivery.

According to the digital broadcast signal processing apparatus, it becomes possible to reduce the processing load for mapping the position of the movable body to map information on a viewer side or a secondary user side. It is needless to say that it becomes remarkably easy for a viewer to grasp the positional relation of an imaging camera because it is made to be possible to supply the mapping information.

Incidentally, if the digital broadcast signal processing apparatus is configured to display also the imaging direction of the imaging apparatus, it is easily realized for the viewer side to select a frame outputted from an imaging apparatus at a specific point.

Incidentally, the digital broadcast signal processing apparatus may be used as a primary station side apparatus that generates and outputs a digital broadcast signal from, for example, a picture signal or a sound signal at the scene or those obtained from the scene. But it does not matter where the place at which the process of the multiplexing the mapping information on the digital broadcast signal is performed, so, the digital broadcast signal processing apparatus may also be used as a secondary station side apparatus that adds information to a digital broadcast signal received from an another digital broadcast signal processing apparatus to deliver the signal.

(5) We propose a digital broadcast signal processing apparatus comprising: an object information for an imaging apparatus generating section on the basis of matching result which is obtained by matching GPS position information of a movable body with imaging area information of an imaging apparatus; and a multiplex processing section for multiplexing the object information of the imaging apparatus on a digital broadcast signal of a corresponding program.

According to the digital broadcast signal processing apparatus, a viewer can easily understand which imaging apparatus is imaging which movable body(s) as an object. Moreover, in case that the digital broadcast signal processing apparatus has a function of successively matching the object information of the imaging apparatus with an object specified by the viewer, and has a function of selectively display the object which is matched to the specific object on a screen, it also becomes possible to display only a specific object on the screen on the viewer side. The so-called chasing display function may be realized.

Moreover, according to the digital broadcast signal processing apparatus, it becomes possible to reduce the load of process for generating the object information by the camera on a viewer side or a secondary user side (e.g. a storage-type service provider or a center station that receives the supply of images from a local station or an outside broadcasting van at the scene).

Incidentally, the digital broadcast signal processing apparatus may be used as a primary station side apparatus that generates and outputs a digital broadcast signal from a picture signal or a sound signal at the scene or those obtained from the scene. But it does not matter where the place at which the processing of the multiplexing of the object information by the imaging apparatus on the digital broadcast signal is performed, so, the digital broadcast signal processing apparatus may be used as a secondary station side apparatus that adds information to a digital broadcast signal received from an another digital broadcast signal processing apparatus to deliver the signal.

(6) We propose a digital broadcast signal processing apparatus comprising: a first memory section for storing GPS position information received from a movable body that is an object; a second memory section for storing imaging area information by an imaging apparatus; and a multiplex processing section for multiplexing the GPS position information and the imaging area information on a digital broadcast signal of a corresponding program.

According to the digital broadcast signal processing apparatus, it becomes possible for a viewer side or a secondary user side to judge easily which imaging apparatus is imaging which movable body(s) as an object by matching the above information. Moreover, in case that the digital broadcast signal processing apparatus has a function of successively matching the object information of the imaging apparatus with an object specified by the viewer, and has a function of selectively displaying the object which is matched the specific object on a screen, it also becomes possible to display only a specific object on the screen on the viewer side. The so-called chasing display function may be realized.

Incidentally, the digital broadcast signal processing apparatus may be used as a primary station side apparatus that generates and outputs a digital broadcast signal from a picture signal or a sound signal at the scene or those obtained from the scene. But it does not matter where the place at which the processing of the multiplexing of the GPS position information of a movable body and the imaging area information on the digital broadcast signal is performed, so, the digital broadcast signal processing apparatus may be used as a secondary station side apparatus that adds information to a digital broadcast signal received from an another digital broadcast processing apparatus to deliver the signal.

(7) We propose a digital broadcast signal processing apparatus, wherein the multiplex processing section according to the aforesaid item (1) further multiplexes profile information (e.g. a player's personal history, a time lap, the present time, a speed and an order) concerning a movable body on a digital broadcast signal.

According to the digital broadcast signal processing apparatus, it becomes possible for a viewer to ascertain the individual information of a movable body in a state such that the individual information is linked with the position information of the movable body and the image of an object, and thereby the usability thereof is remarkably improved.

(8) We propose a digital broadcast signal processing apparatus, wherein the profile information according to the aforesaid item (7) includes uniform resource locator (URL) information or mail address information, both being for access to information concerning a movable body.

According to the digital broadcast signal processing apparatus, it becomes possible for a viewer to access easily to more detailed concerning information (whether it was prepared by a broadcast service provider or not). Moreover, in case that the digital broadcast signal processing apparatus has a function of displaying the information extracted by the access simultaneously with an image, the apparatus may be made to be a system that is user-friendlier. Moreover, it may easily be realized to transmit a mail to a specific player or a specific artist.

(9) We propose a digital broadcast signal processing apparatus comprising: a mapping processing section for separating GPS position information of a movable body that is an object from a digital broadcast signal that was received or reproduced to map position information (e.g. a luminescent spot, an icon, and other identifiable marks) of the movable body on a map on the basis of the GPS position information; and a multiplex processing section for multiplexing mapping information generated in the mapping processing section on a digital broadcast signal of a corresponding program.

The digital broadcast signal may be a ground wave including not only a radio broadcast wave but also a wired broadcast wave or a satellite wave. It is not only a simultaneous broadcast form in which a plurality of channels are used for one program but also a broadcast form using one channel for one program. The broadcast may include a storage-type data delivery.

According to the digital broadcast signal processing apparatus, it is possible to supply the position information of a movable body to a viewer even if mapping information generated by mapping the position of the movable body on a map is not given on a primary station apparatus side. Thereby, it becomes remarkably easy for the viewer to grasp the positional relation of the movable body. Incidentally, if the digital broadcast signal processing apparatus is configured to display also the moving direction of the movable body on the map, it becomes easier for the viewer to grasp the moving direction of the movable body.

Incidentally, the digital broadcast signal processing apparatus may be used as a secondary station side apparatus (a system for providing a storage-type service or a center station that receives the supply of images from an outside broadcast van at the scene) that receives the supply of a digital broadcast signal from, for example, a primary station side apparatus to deliver the digital broadcast signal to a viewer side.

(10) We propose a digital broadcast signal processing apparatus comprising: a mapping processing section for separating GPS position information of an imaging apparatus from a digital broadcast signal that was received or reproduced to map position information of the imaging apparatus on a map on the basis of the GPS position information; and a multiplex processing section for multiplexing mapping information generated in said mapping processing section on a digital broadcast signal of a corresponding program.

The digital broadcast signal may be a ground wave including not only a radio broadcast wave but also a wired broadcast wave or a satellite wave. It is not only a simultaneous broadcast form in which a plurality of channels are used for one program but also a broadcast form using one channel for one program. The broadcast may include a storage-type data delivery.

According to the digital broadcast signal processing apparatus, it is possible to supply the position information of an imaging apparatus to a viewer even if mapping information generated by mapping the position of the imaging apparatus on a map is not given on a primary station apparatus side. Thereby, it becomes remarkably easy for a viewer to grasp the positional relation of the movable body and the imaging apparatus. Incidentally, if the digital broadcast signal processing apparatus is configured to display also the imaging direction of an imaging apparatus on the map, it would be easy for viewer to directly select the image which viewer want to see.

Incidentally, the digital broadcast signal processing apparatus may be used as a secondary station side apparatus (a system for providing a storage-type service or a center station that receives the supply of images from an outside broadcast van at the scene) that receives the supply of a digital broadcast signal from, for example, a primary station side apparatus to deliver the digital broadcast signal to a viewer side.

(11) We propose a digital broadcast signal processing apparatus comprising: an object information generation section by an imaging apparatus for separating GPS position information of a movable body that is an object and imaging area information by an imaging apparatus from a digital broadcast signal that was received or reproduced to match the GPS position information of the movable body that is the object and the imaging area information by the imaging apparatus and thereby for generating object information by the imaging apparatus; and a multiplex processing section for multiplexing the object information by the imaging apparatus on the digital broadcast signal.

According to the digital broadcast signal processing apparatus, it becomes possible for a viewer to judge easily which imaging apparatus is imaging which movable body(s) as an object even if object information by an imaging apparatus is not multiplexed on a digital broadcast signal on a primary station apparatus side. Moreover, in case that the digital broadcast signal processing apparatus has a function of successively matching the object information of the imaging apparatus with an object specified by the viewer, and has a function of selectively display of the object which is matched the specific object on a screen, it also becomes possible to display only a specific object on the screen on the viewer side. The so-called chasing display function may be realized.

Incidentally, the digital broadcast signal processing apparatus may be used as a secondary station side apparatus (a system for providing a storage-type service or a center station that receives the supply of images from an outside broadcast van at the scene) that receives the supply of a digital broadcast signal from, for example, a primary station side apparatus to deliver the digital broadcast signal to a viewer side.

(12) We propose a digital broadcast signal processing apparatus comprising: a memory section for storing profile information (e.g. a player's personal history, a time lap, the present time, a speed and an order) concerning a movable body that is an object; and a multiplex processing section for multiplexing the profile information concerning the movable body that is the object of a digital broadcast signal that was received or reproduced on the digital broadcast signal.

According to the digital broadcast signal processing apparatus, it becomes possible for a viewer to ascertain the individual information of a movable body in a state such that the individual information is linked with the position information of the movable body and the image of an object even if object information by an imaging apparatus is not multiplexed on a digital broadcast signal on the primary station apparatus side. Thereby the usability thereof is remarkably improved.

Incidentally, the digital broadcast signal processing apparatus may be used as a secondary station side apparatus (a system for providing a storage-type service or a center station that receives the supply of images from a local station or an outside broadcast van at the scene) that receives the supply of a digital broadcast signal from, for example, a primary station side apparatus to deliver the digital broadcast signal to a viewer side.

(13) We propose a digital broadcast signal processing apparatus, wherein any of the position information of a movable body that is the object, mapping information generated by mapping of the position information of the movable body that is the object and/or position information of an imaging apparatus on a map, imaging area information by the imaging apparatus and object information by the imaging apparatus is multiplexed on the digital broadcast signal according to item (12).

According to the digital broadcast signal processing apparatus, a viewer may simultaneously ascertain various information and the individual information of a movable body, all being displayed on a screen.

(14) We propose digital broadcast signal processing apparatus, wherein the profile information according to item (12) includes uniform resource locator (URL) information or mail address information for access to information concerning a movable body.

According to a digital broadcast signal processing apparatus, it becomes possible for a viewer to access easily to more detailed concerning information (whether it was prepared by a broadcast service provider or not). Moreover, if the digital broadcast signal processing apparatus is configured to display the information extracted by the access simultaneously with an image, the apparatus may be made to be a system that is user-friendlier. Moreover, it may easily be realized to transmit a mail to a specific player or a specific artist.

(15) We propose a digital broadcast signal processing apparatus comprising: a separation section for separating GPS position information of a movable body that is an object from a digital broadcast signal that was received or reproduced; and a mapping processing section for mapping position information of the movable body on a first map (including not only maps stored in a map database but also simplified maps produced by computer graphics. The first map also includes a map in the self apparatus.) separated from the digital broadcast signal or on a second map prepared in the self apparatus on the basis of the separated GPS position information is proposed.

The digital broadcast signal processing apparatus may be not only a receiving apparatus but also a reproducing apparatus and a browser terminal apparatus. It is also applicable in the digital broadcast signal processing apparatus which will be described in the following items (16)-(21).

According to the digital broadcast signal processing apparatus, it is possible to supply the position information of a movable body to a viewer even if mapping information generated by mapping the position of the movable body on a map is not given on a primary station apparatus side and/or a secondary station apparatus side. Thereby, it becomes remarkably easy for the viewer to grasp the positional relation of the movable body. Incidentally, if the digital broadcast signal processing apparatus is configured to display also the moving direction of the movable body on the map, it becomes easier for the viewer to grasp the moving direction of the movable body.

(16) We propose a digital broadcast signal processing apparatus comprising: a separation section for separating GPS position information of an imaging apparatus from a digital broadcast signal that was received or reproduced; and a mapping processing section for mapping position information of the imaging apparatus on a first map (including not only maps stored in a map database but also simplified maps produced by computer graphics. The first map also includes a map in the self apparatus.) separated from the digital broadcast signal or on a second map prepared in a self apparatus on the basis of the separated GPS position information.

According to the digital broadcast signal processing apparatus, it is possible to supply the position information of a movable body to a viewer even if mapping information generated by mapping the position of the movable body on a map is not given on a primary station apparatus side and/or a secondary station apparatus side. Thereby, it becomes remarkably easy for the viewer to grasp the positional relation of the movable body. Incidentally, if the digital broadcast signal processing apparatus is configured to display also the moving direction of the movable body on the map, it becomes easier for the viewer to grasp the moving direction of the movable body.

(17) We propose a digital broadcast signal processing apparatus comprising: a separation section for separating GPS position information of a movable body that is an object and imaging area information by an imaging apparatus from a digital broadcast signal that was received or reproduced; an object information generation section by an imaging apparatus for matching the GPS position information of the movable body that is the object with the imaging area information by the imaging apparatus to generate object information by the imaging apparatus.

According to the digital broadcast signal processing apparatus, it becomes possible for a viewer to judge easily which imaging apparatus is imaging which movable body as an object even if object information by an imaging apparatus is not multiplexed on a digital broadcast signal on a primary station apparatus side and/or a secondary station apparatus side. Moreover, if the digital broadcast signal processing apparatus is configured to perform successively the matching of the object information by the imaging apparatus with an object specified by the viewer to display selectively the image of the imaging apparatus that is accordant on a screen on the viewer side, it also becomes possible to display only a specific object on the screen. The so-called chasing display function may be realized.

(18) We propose a digital broadcast signal processing apparatus comprising: an object chasing function section for matching an identification information of an object designated by a viewer or an operator with an object information by an imaging apparatus separated from a digital broadcast signal that was received or reproduced, and when there is an image which includes the specific object, the object chasing function section selectively outputting the image onto a display.

(19) We propose a digital broadcast signal processing apparatus comprising: an object chasing function section for matching a GPS position information of a movable body corresponding to the identification information of an object designated by a viewer or an operator with imaging area information by an imaging apparatus separated from a digital broadcast signal that was received or reproduced, and when there is an image which includes the movable body in the imaging area, the object chasing function section selectively outputting the image onto a display.

According to the digital broadcast signal processing apparatus, it becomes possible to display only a specific object on a screen. The so-called chasing display function may be realized.

(20) The digital broadcast signal processing apparatus according to item (19), wherein, if there is an image imaged by an imaging apparatus mounted on the movable body and the image is multiplexed on the digital broadcast signal that was received or reproduced, the object chasing function section selectively outputs the image imaged by the imaging apparatus mounted on the movable body during there is no imaging apparatus that makes the movable body designated by the viewer or the operator an object is proposed.

According to the digital broadcast signal processing apparatus, a viewer may continue observing the chasing image of the movable body that the viewer himself or herself designated or the image of the imaging apparatus mounted on the movable body. Thereby, it becomes possible to provide a user-friendlier service.

(21) We propose a digital broadcast signal processing apparatus, one wherein any of the GPS position information of a movable body that is an object, mapping information generated by the mapping of the position information of the movable body that is the object and/or the position information of an imaging apparatus on a map, the imaging area information by the imaging apparatus, and the object information by the imaging apparatus, and profile information concerning the movable body that is the object are multiplexed on a digital broadcast signal that was received or reproduced, the digital broadcast signal processing apparatus comprising an Internet function section for receiving information from a uniform resource locator (URL) that was designated by a viewer or an operator through a communication channel to output the information selectively when an access request is issued from the viewer or the operator to the URL in the case where uniform resource locator (URL) information is included into the profile information for accessing to information concerning the movable body.

According to the digital broadcast signal processing apparatus, it becomes possible for a viewer to access easily to more detailed concerning information (whether it was prepared by a broadcast service provider or not). Moreover, if the digital broadcast signal processing apparatus is configured to display the information extracted by the access simultaneously with an image, the apparatus may be made to be a system that is user-friendlier.

(22) We propose a digital broadcast signal processing apparatus, wherein any of GPS position information of a movable body that is an object, mapping information generated by mapping of position information of the movable body that is the object and/or position information of an imaging apparatus on a map, imaging area information by an imaging apparatus, and object information by an imaging apparatus, and profile information concerning the movable body that is the object are multiplexed on a digital broadcast signal that was received or reproduced, the digital broadcast signal processing apparatus comprising an Internet function section for transmitting a mail to a designated mail address when an access request is issued from a viewer or an operator to the mail address in a case where the mail address is included into the profile information for accessing to information concerning the movable body.

According to the digital broadcast signal processing apparatus, it may easily be realized to transmit a mail to a specific player or a specific artist. Thereby, a user-friendly system may be provided.

(A1) According to the present invention, the mapping processing of a movable body to map information, the chasing processing of the movable body, and the like on a viewer side or a secondary user side become possible.

(A2) According to the present invention, the burden of the mapping processing of a movable body to map information on a viewer side or a secondary user side may be reduced. It is needless to say that it becomes remarkably easy for a viewer to grasp the positional relation of the movable body because the provision of mapping information is made to be possible.

(A3) According to the present invention, the burden of mapping processing of an imaging apparatus to map information on a viewer side or a secondary user side may be reduced. It is needless to say that it becomes remarkably easy for a viewer to grasp the positional relation of the imaging apparatus because the provision of mapping information is made to be possible.

(A4) According to the present invention, a viewer may easily judge which imaging apparatus is imaging which movable body as an object. Moreover, if the matching of object information by an imaging apparatus with an object specified by a viewer is performed, it also becomes possible to display only a specific object on a screen.

(A5) According to the present invention, if the matching of two pieces of information is performed on a viewer side and a secondary user side, it may easily be judged which imaging apparatus is imaging which movable body as an object. Moreover, if the matching of object information by an imaging apparatus with an object specified by a viewer is performed, it is possible to display only a specific object on a screen.

(A6) According to the present invention, it is possible to supply the position information of a movable body to a viewer even if mapping information generated by the mapping of the position of the movable body on a map is not given on a primary station apparatus side. Thereby, it may become remarkably easy for the viewer to grasp the positional relation of the movable body.

(A7) According to the present invention, it is possible to supply the position information of an imaging apparatus to a viewer even if mapping information generated by the mapping of the position of the imaging apparatus on a map is not given on a primary station apparatus side. Thereby, it may become remarkably easy for the viewer to grasp the positional relation of the movable body.

(A8) According to the present invention, the digital broadcast signal processing apparatus makes it possible that a viewer judges which imaging apparatus is imaging which movable body as an object even if object information by an imaging apparatus is not multiplexed on a digital broadcast signal on a primary station apparatus side. Moreover, if matching of the object information by the imaging apparatus with an object specified by the viewer is performed, it may also be possible to display only a specific object on a screen.

(A9) According to the present invention, the digital broadcast signal processing apparatus makes it possible for a viewer to ascertain the individual information of a movable body in such a state that the individual information is linked with the position information of the movable body and the image of the object even if object information by the imaging apparatus is not multiplexed on a digital broadcast signal on a primary station apparatus side, and thereby usability may remarkably be improved.

(A10) According to the present invention, the position information of a movable body may be supplied to a viewer even if mapping information generated by the mapping of the position of the movable body on a map is not given on a primary station apparatus side and/or a secondary station apparatus side. Thereby, the grasp of the positional relation of the movable body by the viewer may remarkably be easy.

Moreover, if the matching of object information by an imaging apparatus with an object specified by a viewer is performed, it is made to be possible to display only a specific object on a screen.

(A11) According to the present invention, a digital broadcast signal processing apparatus may makes it possible for a viewer to access easily to relating more detailed information. Moreover, if the digital broadcast signal processing apparatus is configured to display the information extracted by the access simultaneously with an image, the apparatus may be made to be a user-friendlier system.

(A12) According to the present invention, the transmission of a mail to a specific player or a specific artist on a viewer side may easily be realized. Thereby, a user-friendly system may be provided.

(A13) According to the present invention, the provision of a user-friendly service in which, while the position information of a movable body is ascertained or the chasing screen of a designated movable body is enjoyed, the necessary other information may be ascertained at the same time is made to be possible.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 11 is a view showing a mode selection screen example;

FIG. 12 is a view showing an example of a multiplex screen display (including an image of a selection channel, mapping information, and profile information); and FIG. 13 is a view showing a state in which detailed profile information is displayed.

DESCRIPTION OF THE PREFERRED EMBODIMENTS

Hereinafter, the attached drawings are referred while the preferred embodiments of the present invention are described as the implementation of the aforesaid resolving means.

(1) Digital Broadcast System (1-1) System Configuration Examples

Figure 1:
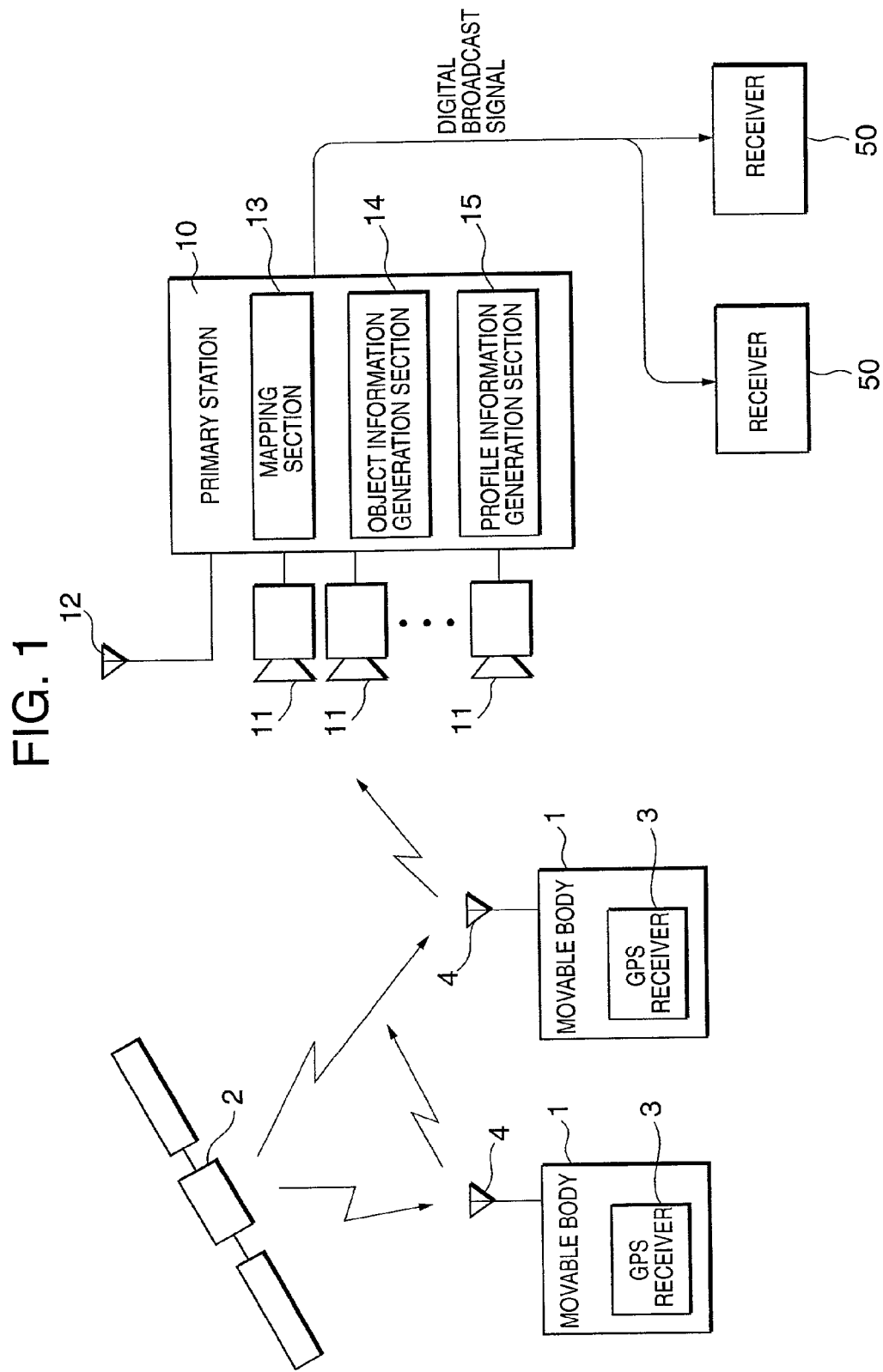
FIG. 1 is a view showing a first configuration example of a digital broadcast system.
Figure 2:
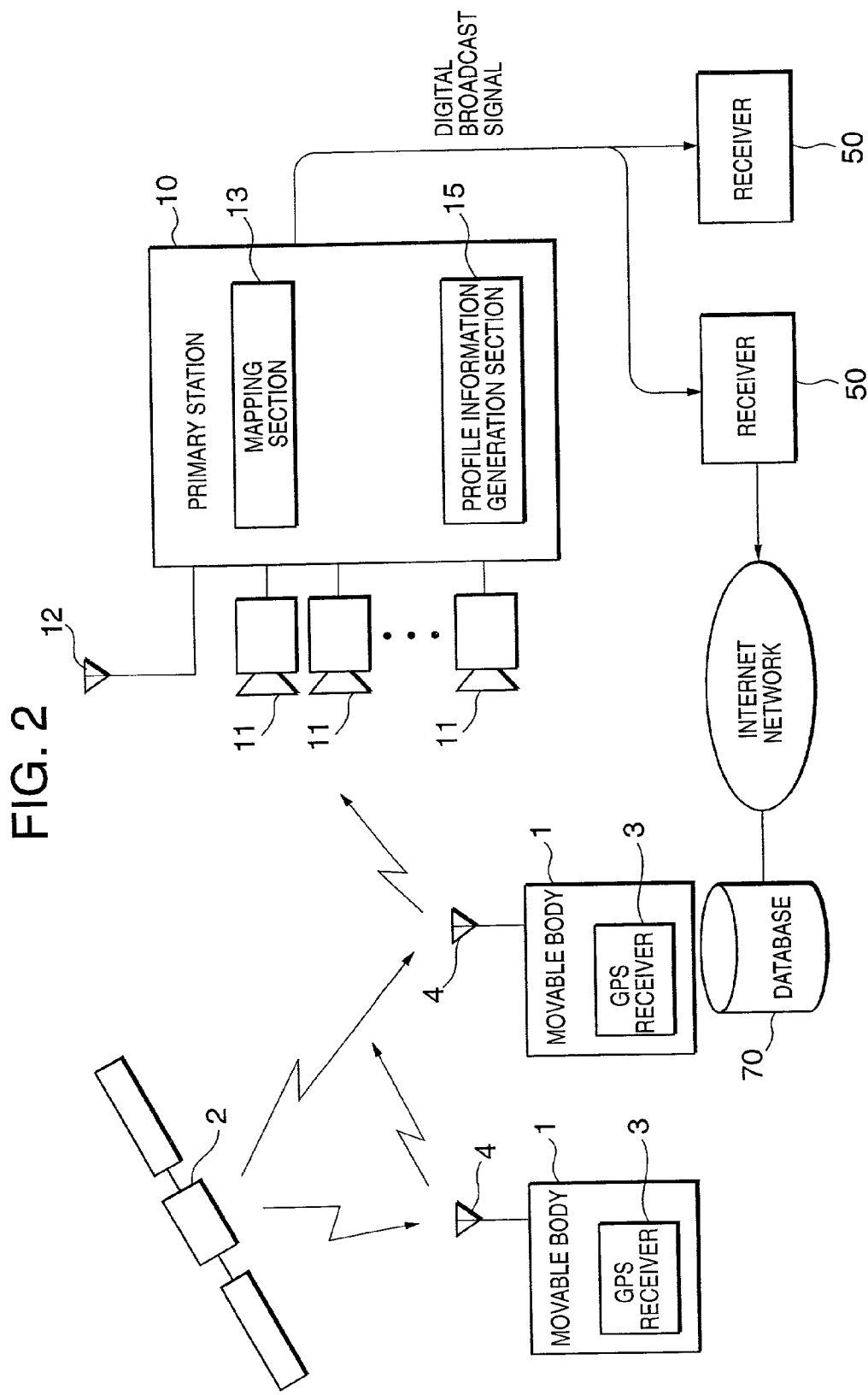
FIG. 2 is a view showing a second configuration example of the digital broadcast system.
Figure 3:
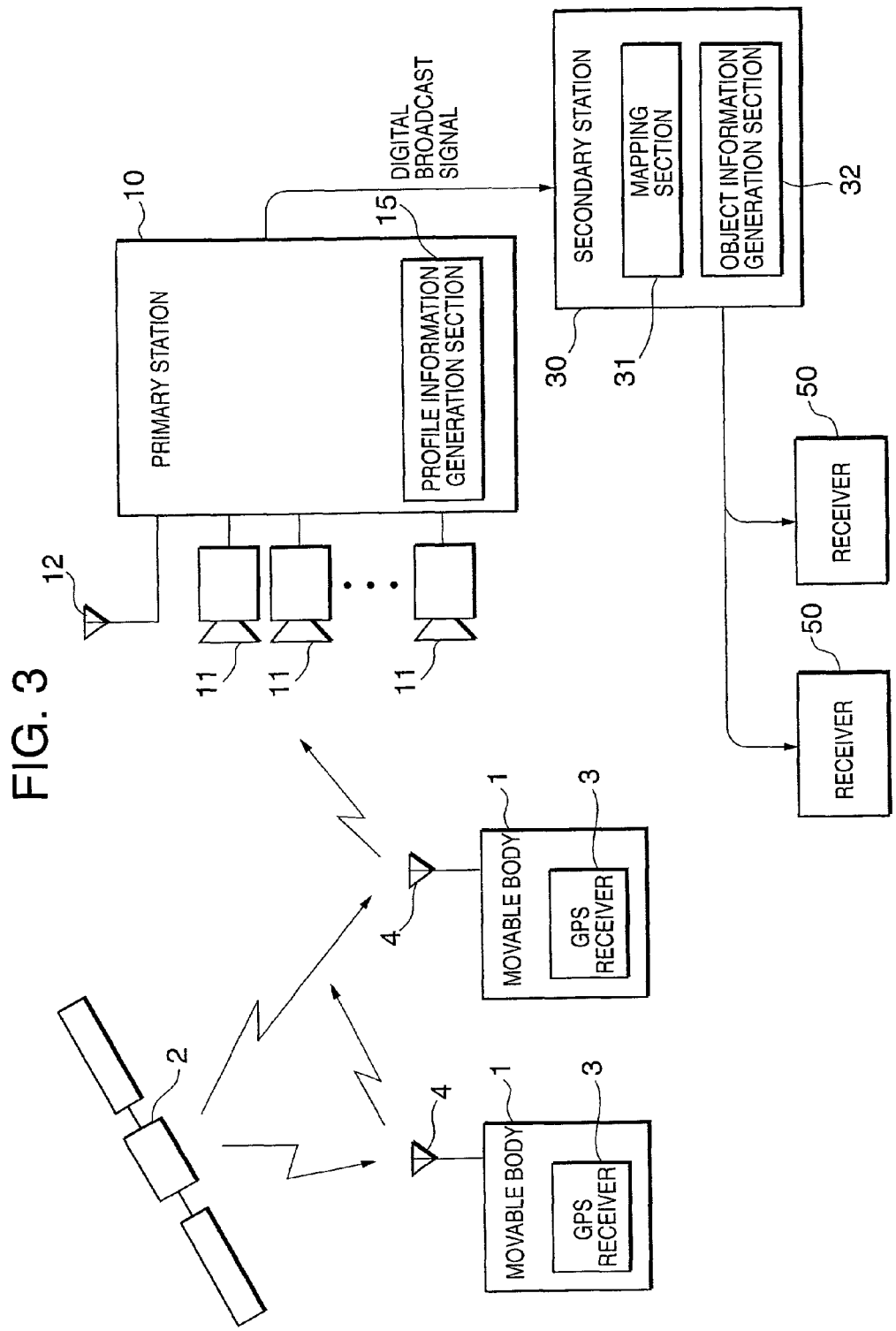
FIG. 3 is a view showing a third configuration example of the digital broadcast system.
Figure 4:
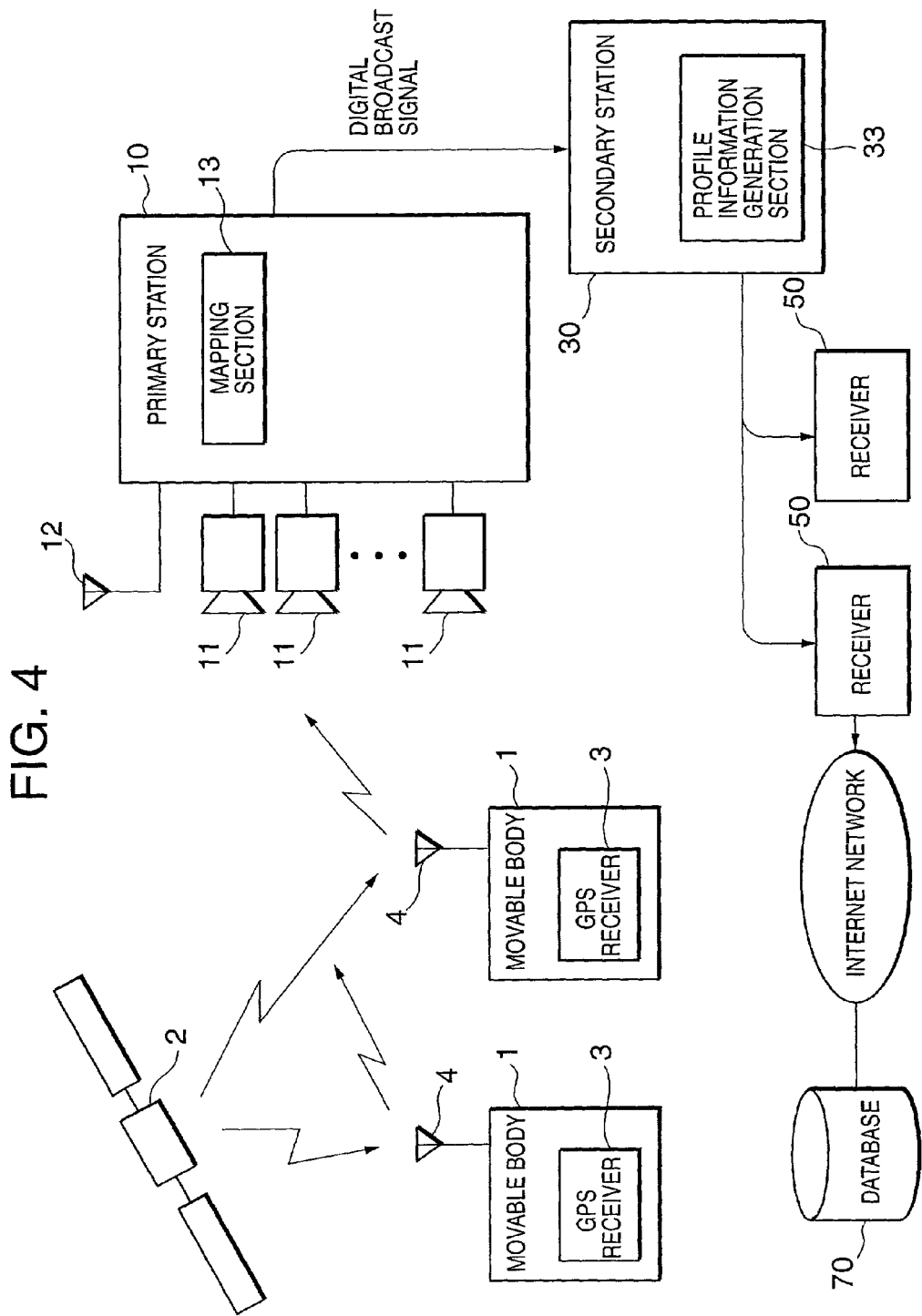
FIG. 4 is a view showing a fourth configuration example of the digital broadcast system.

The configuration examples of a digital broadcast system are shown in FIGS. 1-4. FIG. 1 and FIG. 2 show configuration examples in a form of broadcasting a digital broadcast signal from a primary station to each viewer directly. On the other hand, FIG. 3 and FIG. 4 show configuration examples in a form of broadcasting a digital broadcast signal to each viewer after storing the digital broadcast signal that was broadcast from a primary station in a secondary station, or a form of broadcasting a digital broadcast signal that was received from a primary station to each viewer from a secondary station. Incidentally, the difference between the configurations of FIGS. 1 and 2 and the difference between the configurations of FIGS. 3 and 4 is whether a reception terminal may access to the Internet network to obtain additional information or not.

Figure 5:
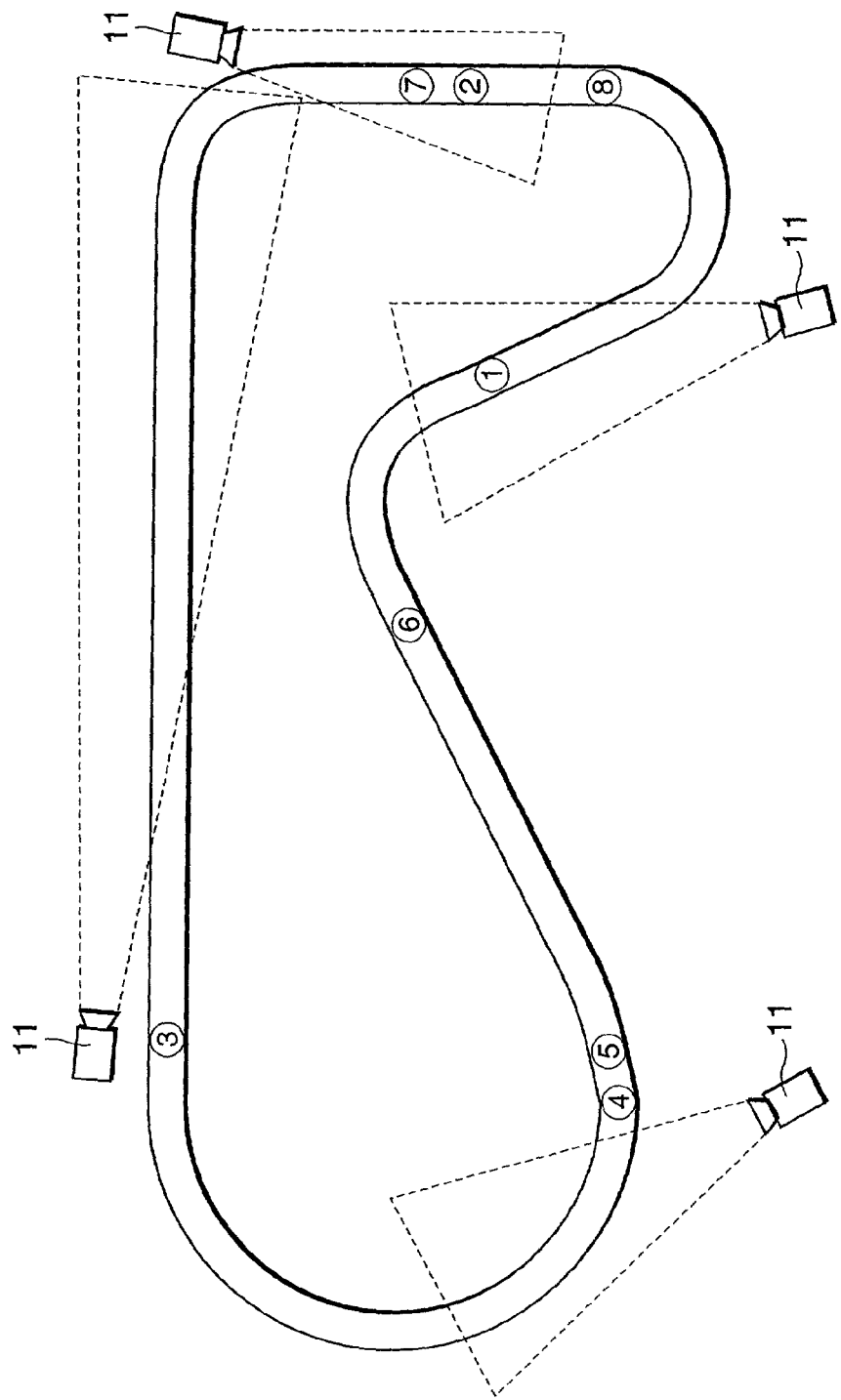
FIG. 5 is a view for the illustration of concrete examples of imaging objects and the imaging area of imaging apparatus.

Each drawing shown in FIGS. 1-4 supposes a case where a plurality of angle images set at a circuichasecourse like one shown in FIG. 5 are simultaneously broadcasted (namely, a case where a broadcast using a plurality of channels is performed). Now, it is supposed that a GPS receiver 3 for receiving a GPS signal from a GPS satellite 2 is installed in each movable body (vehicle) 1 running on the racecourse. Moreover, the digital systems are severally configured as follows. That is, the vehicle position (GPS information (consisting of GPS position information (latitude, longitude, and including altitude as the occasion demands) and GPS time information) that was measured by each of the GPS receivers 3 is transmitted from an antenna 4 installed in each vehicle 1 to an antenna (GPS information reception section by a movable body) 12 of a primary station 10. The primary station 10 may grasp the present position, the moving direction, the speed and other information of each movable body (vehicle) 1 on the basis of the GPS information. Moreover, if an imaging apparatus (imaging camera) is mounted on a movable body (vehicle) 1, its image signal is also informed to the primary station 10 side through the antenna 4.

On the side of the primary station 10, a plurality of imaging cameras 11 are connected. Any of these imaging cameras 11 is a fixed camera set on the side of the racecourse. When such a simultaneous broadcast is not performed, though, it is possible that only one of the imaging cameras 11 is used. The connections between the imaging cameras 11 and the primary station 10 may be wired connections or ones through radio channels. It is supposed that the position information of each imaging camera 11 is supplied to the primary station 10 from a GPS receiver that is installed in the camera or is disposed in the vicinity of the camera.

In such a way, such information as the GPS information of the movable bodies (vehicles) 1, the position information of imaging cameras 11, image information of the cameras installed in each movable body (vehicle) 1 and the like is gathered to the primary station 10. The information generated by the editing of these pieces of information is broadcast or transmitted as a digital broadcast signal. Incidentally, even if a plurality of imaging cameras 11 are prepared, a case where the bandwidth that digital broadcast signals use is only for one channel for an image generated by the editing of the images from each imaging camera 11 is possible.

The other detailed configurations of the primary station 10 will be described later. However, as functions that may be installed in the primary station 10, there are a mapping function section 13 for mapping the positions of the movable bodies (vehicles) 1 and the positions of the imaging cameras 11 on a map, an object information generation section 14 for generating object information by the imaging camera 11, and a profile information generation section 15 for generating the profile information of drivers and teams as auxiliary data.

Incidentally, FIG. 1 shows a case where all of these three function sections exist in the primary station 10. Consequently, in case of FIG. 1, the picture signal of each imaging camera 11, mapping information in which the positions of the vehicles 1 and the imaging cameras 11 are mapped on a map, and object information and profile information by the imaging camera 11 are multiplexed in digital broadcast data transmitted from the primary station 10. In case of the configuration, it is not necessary for receivers 50 to generate such information in them, and the information may be used by being separated from received digital broadcast signals.

On the other hand, FIG. 2 shows a case where the primary station 10 has only two of the three function sections, that is the mapping function section 13 and the profile information generation section 15. Consequently, in case of FIG. 2, the primary station 10 transmits digital broadcast data which includes the picture signal of each imaging camera 11, mapping information in which the positions of the movable bodies (vehicles) 1 and the imaging cameras 11 are mapped on a map, and profile information by the vehicle. In such a case, if imaging area information by the imaging camera 11 (the information shown by enclosures of broken lines in FIG. 5. The information is expressed by means of latitude and longitude (also by the use of altitude as the need arises).) and the GPS position information of each movable body (vehicle) 1 are included in a digital broadcast signal broadcasted from the primary station 10, object information by a camera may be generated on the receiver 50 side, and thereby the chasing display of a specific object may be realized. Moreover, each receiver 50 has a function that makes it possible to access to a database 70 in the Internet network through a communication channel on the basis of uniform resource location (URL) information or a mail address embedded in the profile information.

On the contrary, FIG. 3 shows a case where only the profile information generation section 15 is provided in the primary station 10 and the other two functions are provided in a secondary station 30. Now, it is conceivable that the primary station 10 and the secondary station 30 are under relations such as the relation between a key station and an affiliated station and vice versa, the relation between a broadcasting station and a storage-type on-demand broadcast service trader, and the like besides the relation of an outside broadcast van and a center station. Incidentally, for the realization of the mapping function and the object information by a camera generation function on the secondary station 30 side, it is necessary that the GPS position information of the movable bodies (vehicles) 1, the GPS position information of the imaging cameras 11 and the imaging area information by the imaging camera 11 are included in digital broadcast signals output from the primary station 10. It is needless to say that it is premised on that a mapping function section 31 and an object information generation section 32, both capable of executing such functions, exist in the secondary station 30. The detailed configuration of the secondary station 30 will also be described later. Incidentally, by the provision of the profile information generation section 33 in the secondary station 30, it also becomes possible to add peculiar information on the secondary station 30 side.

Moreover, FIG. 4 shows a case where the mapping function section 13 is provided in the primary station 10 and a profile information generation section 33 is provided in the secondary station 30. Incidentally, the function for chasing a specific object may be realized by a function on the receiver 50 side provided that the GPS information of each movable body (vehicle) 1 and the imaging area information by an imaging camera are multiplexed on a digital broadcast signal broadcast from the secondary station 30 (namely, on a digital broadcast signal transmitted from the primary station 10).

As mentioned above, four system configuration examples were illustrated. However, as described in "summary of the invention", various combinations of the system configurations are conceivable according to necessary functions and system properties.

(1-2) Digital Broadcast Signal Processing Apparatus (Primary Station)

Figure 6:
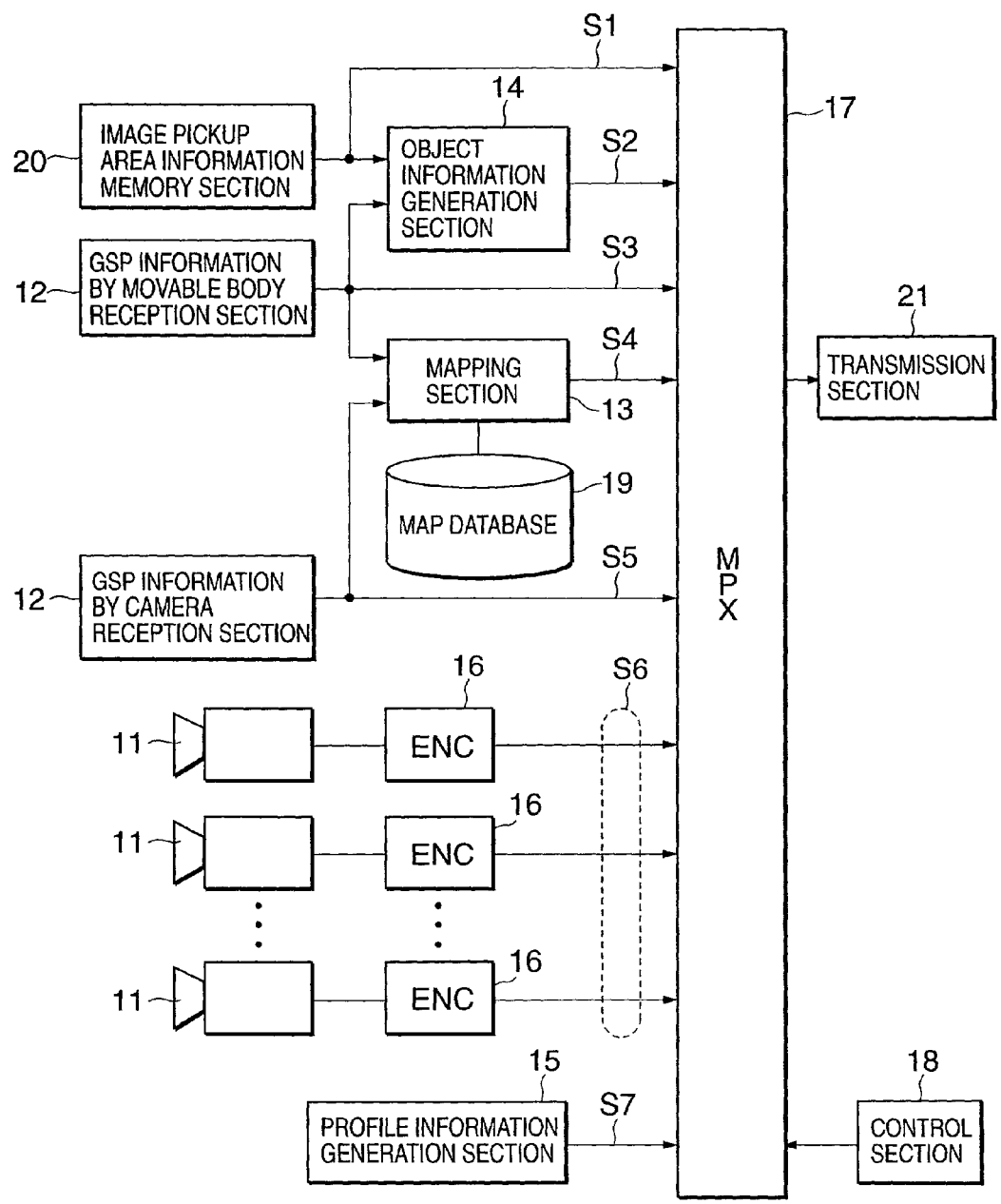
FIG. 6 is a functional block configuration diagram showing a case where a digital broadcast signal communication apparatus is used in a primary station.

FIG. 6 shows a configuration example of a digital broadcast signal processing apparatus suitable for the use as the primary station 10. Incidentally, FIG. 6 functionally shows only principal configuration sections of the apparatus, and the disclosed in FIG. 6 does not restrain the details circuits of the digital broadcast signal processing apparatus.

In case of FIG. 6, the primary station 10 includes imaging cameras 11 (They may be fixed cameras or portable type imaging cameras. Moreover, in the case where imaging cameras mounted on the movable bodies (vehicles) 1 exist, the imaging cameras are also comprehended as the imaging cameras 11.), the GPS information reception sections by a movable body 12 for receiving GPS information from each movable body (vehicle) 1, the mapping function section 13 for generating mapping information, the object information by a camera generation section 14 for generating object information by an imaging camera, the profile information generation section 15, encoders 16 for performing the compression encoding of television signals imaged by the imaging cameras 11 in conformity with the MPEG system or the other systems, a multiplex section (MPX) 17 for executing the multiplex processing of each data stream and each information, a control section 18 for performing the control of the multiplex section 17, a map database 19 for storing map information, an imaging area information memory section 20 for saving imaging area information by an imaging camera, and a transmission section 21 for transmitting a multiplexed output of the multiplex section 17 to a transmission line (It is no matter whether it is radio or wired. Moreover, it is no matter whether it is a ground wave or a satellite wave.). It is needless to install all of the function sections shown in FIG. 6, though. The combinations of functions that are actually installed differ according to a system to which the primary station 10 is applied.

Incidentally, the multiplex section 17 functions as a function section that receives the inputs of imaging area information S1 by an imaging camera, object information S2 by an imaging camera, the GPS information (GPS position information and GPS time information) S3 of each movable body (vehicle) 1, mapping information S4, the GPS information (GPS position information and GPS time information) S5 of each imaging camera, compression-encoded picture signals and sound signals S6, and profile information S7 in order from the top of the drawing, and that performs the multiplex processing of an arbitrary combination of them in conformity with the control or the setting of the control section 18 to generate a digital broadcast signal.

However, in case that a viewer may enjoy the equal functions even if the object information by an imaging camera S2 is not multiplexed, it is desirable to multiplex the imaging area information by an imaging camera S1 with the GPS information (the GPS position information and the GPS time information) S3 of each movable body (vehicle) 1. Moreover, in case that a viewer may enjoy the equal functions even if the mapping information S4 is not multiplexed, it is desirable to multiplex the GPS information S3 of each movable body (vehicle) 1 and/or the GPS information S5 of each imaging camera.

Incidentally, it depends on the judgment of a manager who manages the primary station 10 whether the mapping function section 13 maps only the position information of the movable bodies 1 on a map or not or whether the mapping function section 13 maps only the position information of the imaging cameras 11 on a map or not.

Moreover, the object information by a camera generation section 14 matches GPS position information received from a movable body (vehicle) 1 that is an object with imaging area information by an imaging camera (for example, the information of the latitude and the longitude of four corners of an imaging area is previously given, and the object information by a camera generation section 14 is configured so as to be able to judge the inside of the line segments connecting the four corners as an imaging area). When a movable body 1 is placed in a region designated by the imaging area information, the object information by a camera generation section 14 generates information indicating that the movable body 1 is the object at present. On the contrary, when a movable body 1 is not placed at the region designated by the imaging area information, the object information by a camera generation section 14 generates information indicating that the movable body 1 is not the object at present. The result of the judgment of the object information by a camera generation section 14 as to each movable body 1 by an imaging camera is the object information by an imaging camera S2.

Incidentally, the object information by a camera generation section 14 is configured such that the general information of imaging area information by an imaging camera that is to be stored in the imaging area information memory section 20 is input before the starting of imaging.

Moreover, it also depends on the judgment of a manager managing the primary station 10 whether the profile information generation section 15 inserts the link information to a home page and a mail address, both concerning drivers and players, into a text or not.

(1-3) Digital Broadcast Signal Processing Apparatus (Secondary Station)

Figure 7:
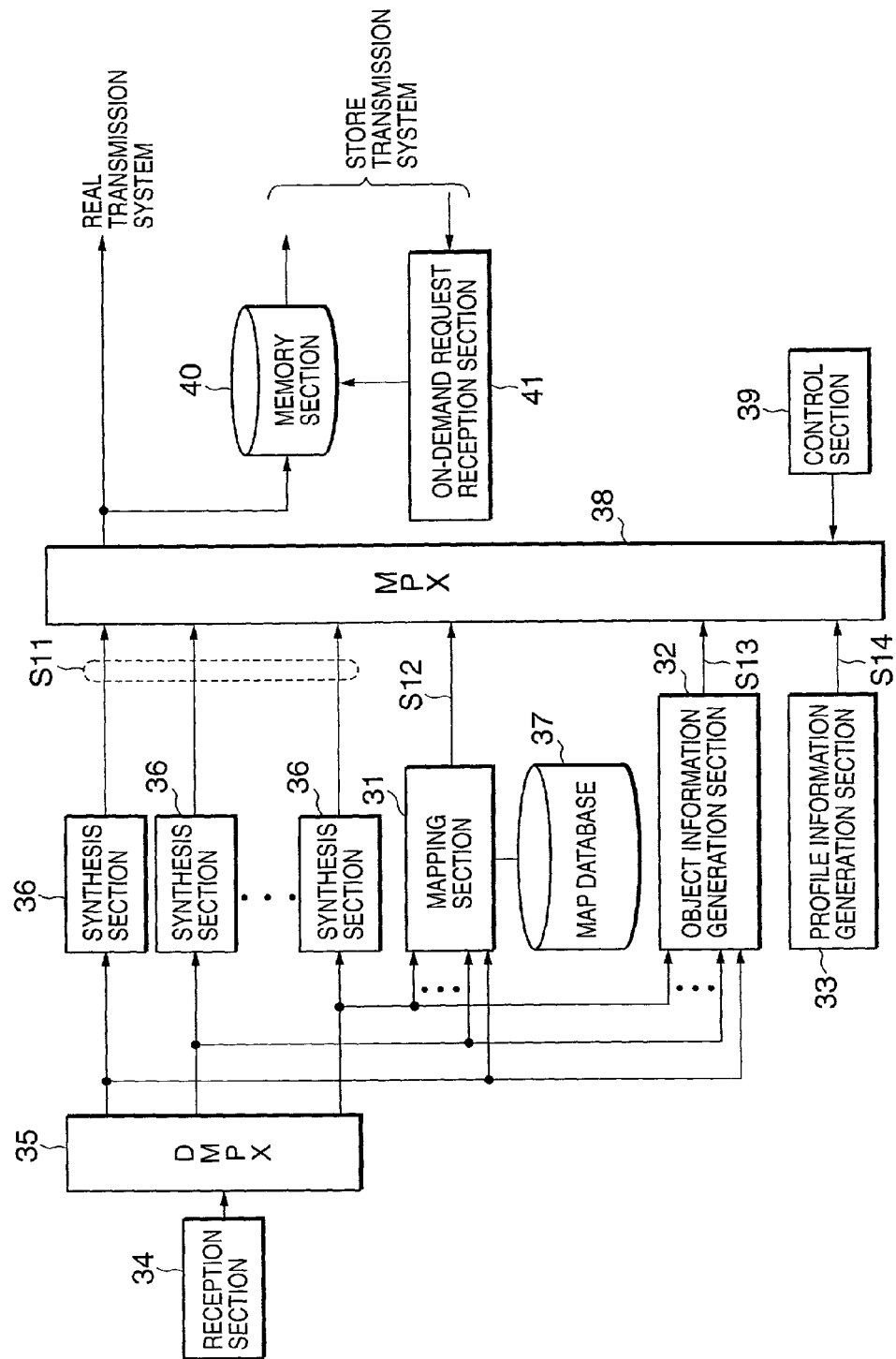
FIG. 7 is a functional block configuration diagram showing a case where the digital broadcast signal communication apparatus is used in a secondary station.

FIG. 7 shows a configuration example of a digital broadcast signal processing apparatus that is suitable for the use as the secondary station 30. Incidentally, FIG. 7 functionally shows only the principal configuration sections of the apparatus, and the disclosure in FIG. 7 does not restrain the concrete circuit configuration of the apparatus.

In case of FIG. 7, the secondary station 30 includes the mapping function section 31 for generating mapping information, the object information by a camera generation section 32 for generating object information by an imaging camera, the profile information generation section 33, a reception section 34 for receiving a digital broadcast signal that was broadcast or transmitted from the primary station 10, a separation section (DMPX) 35 for separating the digital broadcast signal into TS packets, synthesis sections 36 for synthesizing TS streams from the separated TS packets, a map database 37 for storing map information, a multiplex section (MPX) 38 for executing the multiplex processing of each data stream and each information, a control section 39 for controlling the multiplex section 38, a memory section 40 for storing digital broadcast signals, and a on-demand request reception section 41 for reading out a desired digital broadcast signal from the memory section 40 in response to a demand from the receiver 50 side. However, it is not necessary that the secondary station 30 is equipped with all of the function sections shown in FIG. 7. The combinations of functions that are installed in the secondary station 30 differ according to a system to which the secondary station 30 is applied. For example, if the secondary station 30 is not used as a storage-type on-demand server, the memory section 40 and the on-demand request reception section 41 are not necessary.

Incidentally, the multiplex section 38 functions as a function section that receives the inputs of TS streams S11, mapping information S12, object information by an imaging camera S13, and profile information S14 in order from the top of the drawing, and that performs the multiplex processing of an arbitrary combination of them in conformity with the control or the setting of the control section 39 to generate a digital broadcast signal.

Incidentally, the case where the mapping function section 31 may function to output the mapping information S12 is a case where the GPS information of each movable body (vehicle) 1 and/or the GPS information of each imaging camera are multiplexed on a received digital broadcast signal or a case where these pieces of information are separately given. Moreover, the case where the object information by a camera generation section 32 for generating object information by an imaging camera may function to output the object information by an imaging camera S13 is a case where imaging area information by an imaging camera and the GPS information of each movable body (vehicle) 1 are multiplexed on a received digital broadcast signal.

Moreover, it also depends on the judgment of a manager managing the secondary station 30 whether the profile information generation section 33 inserts the link information to a home page and a mail address, both concerning drivers and players, into a text or not.

(1-4) Digital Broadcast Signal Receiving Apparatus

Figure 8:
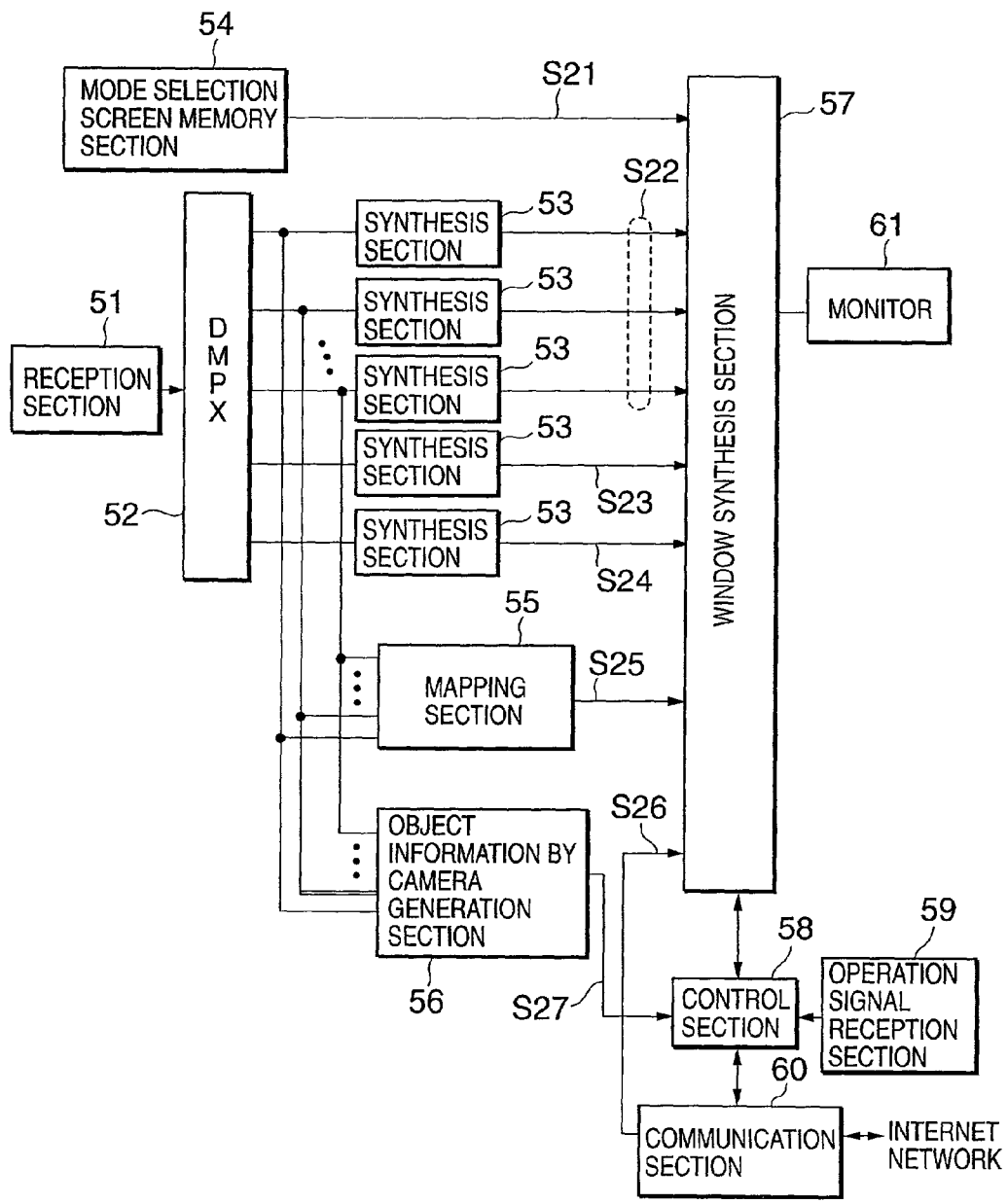
FIG. 8 is a functional block configuration diagram showing a digital broadcast signal receiving apparatus.

FIG. 8 shows a configuration example of a digital broadcast signal receiving apparatus that is suitable for the use as the receiver 50. Incidentally, FIG. 8 functionally shows only the principal configuration sections of the apparatus, and the disclosure does not restrain the concrete circuit configurations of the apparatus.

In case of FIG. 8, the receiver 50 includes a reception section 51 for receiving a digital broadcast signal (It is no matter whether the reception section 51 receives the digital broadcast signal through a radio propagation channel or through a wired path), a separation section (DMPX) 52 for separating the digital broadcast signal into TS packets, synthesis sections 53 for synthesizing TS streams from the separated TS packets, a mode selection screen memory section 54, a mapping function section 55, an object information by a camera generation section 56, a window synthesis section 57, a control section 58 for controlling the window synthesis section 57, an operation signal reception section 59 for receiving an operation signal from a remote controller, a communication section 60 for accessing to the Internet network when the access to a URL or a mail address, both being embedded in profile information, is requested, and a monitor 61 as an image output section. However, it is not necessary that the receiver 50 is equipped with all of the function sections shown in FIG. 8. The combinations of functions that are actually installed on the receiver 50 differ according to the system to which the receiver 50 is applied.

Incidentally, the window synthesis section 57 synthesizes a window screen to be output to the monitor 61. Now, the window synthesis section 57 performs the synthesis of a mode selection screen signal S21, picture signals S22 of the pictures imaged by the imaging cameras, mapping information S23 (in the case where the information is included in a digital broadcast signal) and S25 (in the case where the information was generated on the receiver side), profile information S24, and a Web image S26 in order from the top of the drawing. It depends on the selection of a viewer how to synthesize and display them.

Incidentally, the case where the mapping function section 55 may function to output the mapping information S25 is a case where the GPS information of each movable body (vehicle) 1 and/or the GPS information of each imaging camera are multiplexed on a received digital broadcast signal or a case where these pieces of information are separately given. Moreover, the case where the object information by a camera generation section 56 for generating object information by an imaging camera may function to output the object information by an imaging camera S27 is a case where imaging area information by an imaging camera and the GPS information of each movable body (vehicle) 1 are multiplexed on a received digital broadcast signal.

Incidentally, the object information by an imaging camera S27 that was generated by the object information by a camera generation section 56 is given to the control section 58. This is for the realization of a function for tracing and displaying a specific object in the control section 58.

Figure 9:
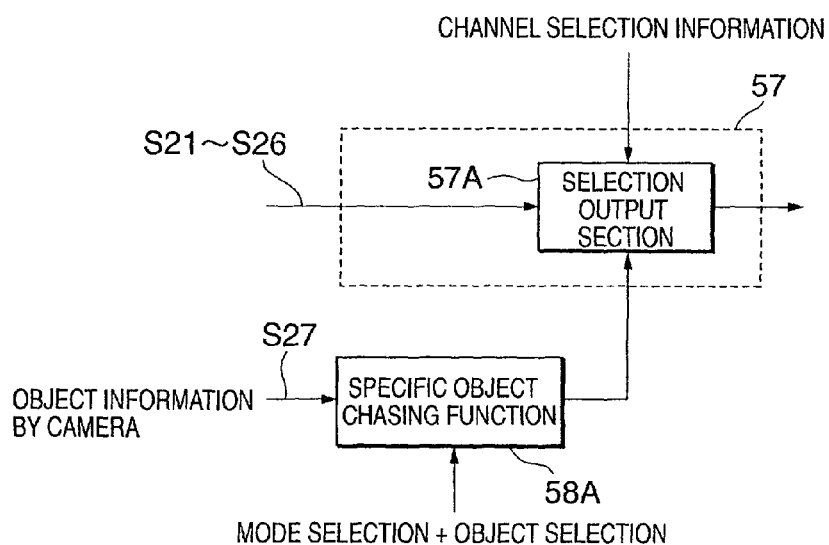
FIG. 9 is a functional block configuration diagram showing a specific object chasing function.

FIG. 9 shows the object chasing function supplied by the control section 58 by means of a function blocks. Incidentally, FIG. 9 shows the function configuration schematically. In this connection, the function may be realized not only as the processing on software but also as the function on hardware. In FIG. 9, the function on software that is realized by the control section 58 is expressed as a specific object chasing function section 58A.

When the specific object chasing function section 58A ascertained that a mode such that a viewer chased and displayed a specific movable body as an object had been selected and the specific object chasing function section 58A received the information of a movable body to be chased, the specific object chasing function section 58A matches the identification information thereof and object information by an imaging camera S27 generated by the object information by a camera generation section 56, and thereby the specific object chasing function section 58A judges whether a imaging camera including the designated movable body as an object exists or not.

Now, when the imaging camera including the movable body as an object exists, the specific object chasing function section 58A outputs a selection instruction such that the image of the imaging camera is displayed on the monitor 61. In FIG. 9, such a function of the window synthesis section 57 is expressed as a main screen selection and output section 57A.

Moreover, in the case where an image from an imaging camera mounted on a movable body is included in a digital broadcast signal, the specific object chasing function section 58A gives a switching instruction so as to display an image of the imaging camera mounted on the movable body to be chased on a screen during the movable body is not an object of any fixed cameras. By the equipment of the function, it becomes possible for a viewer to enjoy the image concerning the noticing movable body fully by the image of a fixed camera and the image of the camera mounted on the movable body.

However, in the case where no imaging camera is mounted on any movable body, the specific object chasing function section 58A estimates an imaging camera imaging the movable body as its object next on the basis of the moving direction of the movable body, and then switches to the estimated imaging camera during no imaging camera images the movable body as an object. By means of the function, it is possible to display a chasing image giving a less feeling of wrongness than a case where a default image set irrelevantly to the moving direction of the movable body is displayed.

Moreover, when the control section 58 judges that the access to a URL or a mail address, both being embedded in profile information, is requested from an operation signal from a viewer, the control section 58 accesses to the designated URL through the communication section 60. Incidentally, a downloaded Web image is given to the window synthesis section 57 from the communication section 60 to be synthesized and displayed on a screen. Moreover, when the access to a mail address is demanded, the control section 58 displays a mail-drafting picture on a screen, and transmits an input mail to the Internet network from the communication section 60.

(1-5) Configuration of Database

Figure 10:
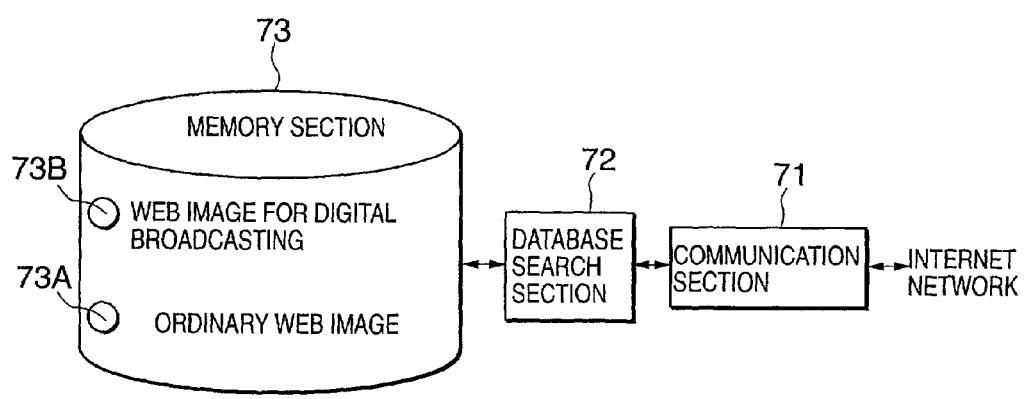
FIG. 10 is a view showing a configuration example of a database.

FIG. 10 shows a configuration example of the database 70. Incidentally, FIG. 10 functionally shows only the principal configuration sections of the database 70.

In case of FIG. 10, the database 70 includes a communication section 71, a database search section 72 and a memory section 73. Now, the database search section 72 is a means for accessing a designated URL to download a stored Web image. Incidentally, the database 70 may be one managed by the service provider of the primary station 10 and the secondary station 30, or may be one managed the other service provider.

However, the service provider of the primary station 10 and the secondary station 30 would be able to prepare a Web image for digital broadcasting 73B besides an ordinary Web image 73A as shown in FIG. 10. Now, the Web image for digital broadcasting 73B means an image in which larger fonts are used and the arrangements of images are devised for the improvement of the visibility of characters and images on the supposition that a Web image is displayed on an auxiliary screen (namely, the Web image is not displayed as the whole screen display and is displayed as a display not using the most part. Generally, the Web image is displayed as a divided screen.) for not impeding the looking and listening of a digital broadcast program.

By the preparation of such a Web image for digital broadcasting 73B, the visibility of a viewer may remarkably be improved and the function may be meaningful. Incidentally, in the case where these pieces of information are supplied to a personal digital assistant (PDA) or a mobile telephone, Web images among each browser terminal and conversion software are prepared.

(2) Examples of Displayed Screens

FIG. 11 to FIG. 13 show display examples of mode selection screens, profile information and the like. Incidentally, these screen examples suppose a program broadcasting the sate of a car race held at a circuichasecourse.

FIG. 11 is an example of a screen displayed in the case where mode selection is selected by a remote controller and the like. The information of the screen is stored in the mode selection screen memory section 54. As described above, FIG. 11 shows a screen for a car race, but it is desirable that several kinds of mode selection screen information are stored in the mode selection screen memory section 54 in order that selection buttons suitable for each event should be displayed. However, it is also possible to adopt such a form that an service provider who provides the program prepares these mode selection screens to transmit the prepared mode selection screens after multiplexing them on a digital broadcast signal. Because, in this case, buttons suitable for the programs may be prepared, the operability of a viewer is improved.

As for the display position of mode items 80 in the mode selection screen, in case of FIG. 11, the mode items 80 in a shape of a button are displayed at a lower column in the screen lest they hinder the display of images. It is needless to say that their display position may be an upper column in the screen, or may be the left side or the right side in the screen. Moreover, it may also be displayed at the center of the screen.

The mode items 80 prepared in FIG. 11 are four: a map 81, a driver 82, a camera 83 and a profile 84. Now, the map 81 is an item to be used for displaying a screen generated by the mapping of the positions of movable bodies or imaging cameras on a map at a prescribed region on the screen (the right side region in the screen in case of FIG. 12). The driver 82 is an item prepared for the chase and display of a specific vehicle. In the case where the item was selected, the images of imaging cameras output to the monitor 61 are automatically switched. The camera 83 is a button used for displaying selectively images imaged by a specific fixed camera. The button is convenient to select a desired image after the ascertainment of the positions of the movable bodies and the imaging cameras on a map. The profile 84 is a button used for the looking of the information that concerns drivers and vehicles and was previously multiplied on a digital broadcast signal by the program provider in advance.

FIG. 12 shows an example of display of a case where these mode items were selected. In case of FIG. 12, the image 85 of a channel selected as a main screen, a mapping screen 86 showing the positions of vehicles being movable bodies and imaging cameras that are mapped on a map, and a profile screen 87 the contents of which are the lap time, the speed and the other time data of each vehicle, personal results and the other personal information are displayed on the screen.

By the possibility of such a screen display, a viewer may enjoy a plurality of channel screens that are delivered at the same time by changing them freely, and moreover the viewer may obtain necessary information and may understand the state of the scene such as the positional relations of the movable bodies and the imaging cameras. Furthermore, on the assumption of such understanding, the viewer may select an image that was imaged at appropriate timing and at an appropriate position, and may select an image in a favorite direction without being bewildered. Incidentally, as a specifying method of drivers and imaging cameras, a method in which an item is selected among selection items linked to each item and moreover a method in which an item that is specified by the click of a cursor displayed on a screen is selected are conceivable.

Incidentally, it is regarded as general that profile information is prepared hierarchically. For example, when an operation input requesting the disclosure of more detailed information of the driver or the vehicle of ① on the screen of FIG. 12 is input, the receiver 50 reads out the information linked to the item ① to display the read out information on the screen as shown in FIG. 13. The contents shown on the screen are also supplied from the provider supplying the program.

By the way, some viewers want to know more detailed information or related information. For such viewers, if a URL 88 and a mail address 89 concerning each movable body are embedded in profile information in order that such viewers may easily access to necessary information, the viewers may obtain the necessary information only by selecting the items with a remote controller or the like, and they may display the necessary information on the screen.

Incidentally, the receiver 50 is connected with the Internet network through a communication channel at this time, and the receiver 50 downloads necessary information to display the information on a screen. Generally, the information obtained through the Internet is displayed at the display column of profile information in a superposed state lest the obtained information prevent the looking and the listening of a program broadcast. At this time, when the Web image designated by the URL 88 is one prepared for the display in such a digital broadcast screen, the characters and figures of the Web image is displayed with a comparatively large fonts and layouts, and consequently the Web image may be displayed in a state of being comparatively easily looked even if the Web image is displayed in a divided screen.

(3) Effects of the Embodiments

According to the afore-mentioned embodiments, a mapping function, an object information by camera generation function, and a profile display function are provided, and thereby the digital broadcast signal processing apparatus may be made to have better usability for a viewer irrespectively of which place these functions are practiced at.

For example, because the positions of movable bodies (vehicles in this example) and imaging cameras may be ascertained on a map, a viewer may look and listen the contents of a broadcast on the basis of the understanding of the positional relations. Moreover, the viewer may designate an image that the viewer wants to look at directly (namely, without switching channels actually) for looking and listening.

Furthermore, because a receiver may grasp the information concerning which movable body is imaged by which imaging camera as an object, a viewer may look and listen a chase screen of a designated movable body only by designating a specific movable body.

Furthermore, because the identification of profile information concerning each movable body is possible on these screens at the same time, it becomes possible to enjoy a broadcast program from various viewpoints. Moreover, because link to the information on the Internet may be realized, the demand of a viewer may fully be satisfied.

(4) Other Embodiments

In the aforesaid embodiments, as shown in FIG. 5, the descriptions are given to a car race held in a circuichasecourse as supposition, however, as previously described, applicable broadcast programs cover a wide range of a case where objects move such as an event program and sport program and a case where objects are found here and there in a wide range such as a sport event (e.g. a marathon race, a swimming race and a combat sport), a motor sport (e.g. an automobile, a motor bicycle and a bicycle), horse racing, water sports (e.g. a yachchase, a boachase and diving), an outdoor broadcasting program of a concert, and a reporting program at the scene (e.g. a case where reporters are objects). Accordingly, when the embodiments are applied to each case, the drivers that are described in the aforesaid embodiments may be replaced with players, reporters and artists, and vehicles may be replaced with motor bicycles, yachts or the like.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A digital broadcast signal processing apparatus comprising:
    a memory section for storing GPS position information received from a movable body that is an object in a corresponding program;
    a multiplex processing section for multiplexing on a digital broadcast signal of the corresponding program,
    1) GPS position information received from the movable body,
    2) GPS position information and imaging area information received from an imaging apparatus that is operable to acquire imaging area information concerning the corresponding program and is disposed mechanically independent of a movable body that is an object in the corresponding program, and
    3) mapping information , which indicates position information of the movable body and position information of the imaging apparatus on a map,
    a display for displaying a plurality of modes and a plurality of display objects,
    wherein each of the plurality of display objects is related to the selection of one of the plurality of modes,
    wherein when one of the display objects is selected, the related mode is displayed,
    wherein each of the plurality of display objects related to the selection of each of the plurality of modes for display purposes are all displayed simultaneously,
    wherein each of the plurality of modes designated by each of a plurality of user selected display objects are displayed simultaneously, and
    wherein the plurality of modes comprising:
    a mode for displaying a specific object chasing function,
    a mode for displaying a view from a specific camera,
    a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and
    a mode for mapping positions of a plurality of movable bodies on the map and displaying a positional relationship between the movable bodies on the screen as a function of the multiplexing processing section,
    wherein, when a specific object chasing function is selected, the display maps the positions of the specific object and plurality of movable bodies on the map, matches identification information of the specific object, and determines whether an image of an apparatus is showing the specific object,
    wherein, if the specific object chasing function determines that the specific object is included in the image of an imaging apparatus, the image of the imaging apparatus is selected, and
    wherein, if the specific object chasing function determines that the specific object is not included in the image of an imaging apparatus, the specific object chasing function estimates which imaging apparatus will show the specific object next, and selects the imaging apparatus that will show the specific object next.

2. A digital broadcast signal processing apparatus comprising:
    a mapping processing section for mapping on a map position information of a movable body that is an object in a corresponding program and position information of an imaging apparatus on a basis of information of a map, GPS position information received from the movable body and GPS position information received from the imaging apparatus,
    wherein the imaging apparatus is operable to acquire imaging area information concerning the corresponding program and is disposed mechanically independent of a movable body that is an object in the corresponding program; and
    a multiplex processing section for multiplexing mapping information generated by said mapping processing section on a digital broadcast signal; and
    a display for displaying a plurality of modes and a plurality of display objects,
    wherein each of the plurality of display objects is related to the selection of one of the plurality of modes,
    wherein when one of the display objects is selected, the related mode is displayed,
    wherein each of the plurality of display objects related to the selection of each of the plurality of modes for display purposes are all displayed simultaneously,
    wherein each of the plurality of modes designated by each of a plurality of user selected display objects are displayed simultaneously, and
    wherein the plurality of modes comprising:
    a mode for displaying a specific object chasing function,
    a mode for displaying a view from a specific camera,
    a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next.

3. The digital broadcast signal processing apparatus according to claim 1, wherein said multiplex processing section multiplexes profile information concerning the movable body on the digital broadcast signal.

4. The digital broadcast signal processing apparatus according to claim 3, wherein said profile information includes uniform resource locator (URL) information or mail address information, both being for access to information concerning the movable body.

5. A digital broadcast signal processing apparatus comprising:

a mapping processing section for separating from a digital broadcast signal that was received or reproduced GPS position information of a movable body that is an object in a corresponding program and GPS position information of an imaging apparatus that is operable to acquire imaging area information concerning the corresponding program and is disposed mechanically independent of a movable body that is an object in the corresponding program, to map position information of the movable body and the imaging apparatus on a map on a basis of information of a map, GPS position information of the movable body and GPS position information of the imaging apparatus; and a multiplex processing section for multiplexing mapping information generated in said mapping processing section on a digital broadcast signal of the corresponding program; and a display for displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising:
a mode for displaying a specific object chasing function,
a mode for displaying a view from a specific camera,
a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map and displaying a positional relationship between the movable bodies on the screen as a function of the multiplexing processing section, wherein the display objects related to the selection of each of the plurality of modes for display purposes are all display simultaneously, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next.

6. A digital broadcast signal processing apparatus comprising:

a memory section for storing profile information concerning a movable body that is an object in a corresponding program; and a multiplex processing section for multiplexing on a digital broadcast signal the profile information, position information of an imaging apparatus that was received or reproduced, and mapping information indicting position information of the imaging apparatus on a map, wherein the imaging apparatus is operable to acquire imaging area information concerning the corresponding program and is disposed mechanically independent of a movable body that is an object in the corresponding program; and a display for displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising:
a mode for displaying a specific object chasing function,
a mode for displaying a view from a specific camera,
a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen,
wherein the web image is obtained only by selecting the URL, and
a mode for mapping positions of a plurality of movable bodies on the map and displaying a positional relationship between the movable bodies on the screen as a function of the multiplexing processing section,
wherein the display objects related to the selection of each of the plurality of modes for display purposes are all display simultaneously,
wherein, when a specific object chasing function is selected, the display maps the positions of the specific object and plurality of movable bodies on the map, matches identification information of the specific object, and determines whether an image of an apparatus is showing the specific object,
wherein, if the specific object chasing function determines that the specific object is included in the image of an imaging apparatus, the image of the imaging apparatus is selected, and
wherein, if the specific object chasing function determines that the specific object is not included in the image of an imaging apparatus, the specific object chasing function estimates which imaging apparatus will show the specific object next, and selects the imaging apparatus that will show the specific object next.

7. The digital broadcast signal processing apparatus according to claim 6, wherein position information of the movable body that is the object, mapping information generated by mapping of the position information of the movable body that is the object and/or position information of an imaging apparatus on a map, imaging area information by the imaging apparatus and object information by the imaging apparatus is multiplexed on the digital broadcast signal.

8. The digital broadcast signal processing apparatus according to claim 6, wherein said profile information includes uniform resource locator (URL) information or mail address information for access to information concerning the movable body.

9. A digital broadcast signal processing method comprising the steps of:
reading out GPS position information received from a movable body that is an object in a corresponding program;
reading out GPS position information received from an imaging apparatus that is operable to acquire imaging area information concerning the corresponding program and is disposed mechanically independent of a movable body that is an object in the corresponding program; and
multiplexing GPS position information received from the movable body, GPS position information received from the imaging apparatus, and mapping information indicting position information of the movable body and the imaging apparatus on a map on a digital broadcast signal of a the corresponding program; and
displaying a plurality of modes and a plurality of display objects,
wherein each of the plurality of display objects is related to the selection of one of the plurality of modes,
wherein when one of the display objects is selected, the related mode is displayed,
wherein each of the plurality of display objects related to the selection of each of the plurality of modes for display purposes are all displayed simultaneously,
wherein each of the plurality of modes designated by each of a plurality of user selected display objects are displayed simultaneously, and
wherein the plurality of modes comprising:
a mode for displaying a specific object chasing function,
a mode for displaying a view from a specific camera,
a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen,
wherein the web image is obtained only by selecting the URL, and
a mode for mapping positions of a plurality of movable bodies on the map; and
displaying a positional relationship between the movable bodies on the screen as a function of the multiplexing processing section,
wherein, when a specific object chasing function is selected, the display maps the positions of the specific object and plurality of movable bodies on the map, matches identification information of the specific object, and determines whether an image of an apparatus is showing the specific object,
wherein, if the specific object chasing function determines that the specific object is included in the image of an imaging apparatus, the image of the imaging apparatus is selected, and
wherein, if the specific object chasing function determines that the specific object is not included in the image of an imaging apparatus, the specific object chasing function estimates which imaging apparatus will show the specific object next, and selects the imaging apparatus that will show the specific object next.

10. A digital broadcast signal processing method comprising the steps of:
mapping on a map position information of a movable body that is an object in a corresponding program and position information of an imaging apparatus on a basis of information of a map, GPS position information received from the movable body and GPS position information received from the imaging apparatus,
wherein the imaging apparatus is operable to acquire imaging area information concerning the corresponding program and is disposed mechanically independent of a movable body that is an object in the corresponding program; and
multiplexing mapping information generated in said mapping step on a digital broadcast signal; and
displaying a plurality of modes and a plurality of display objects,
wherein each of the plurality of display objects is related to the selection of one of the plurality of modes,
wherein when one of the display objects is selected, the related mode is displayed,
wherein each of the plurality of display objects related to the selection of each of the plurality of modes for display purposes are all displayed simultaneously,
wherein each of the plurality of modes designated by each of a plurality of user selected display objects are displayed simultaneously, and wherein the plurality of modes comprising:
a mode for displaying a specific object chasing function,
a mode for displaying a view from a specific camera,
a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and
a mode for displaying a positional relationship between the movable bodies on the screen as a function of the multiplexing processing section,
wherein, when a specific object chasing function is selected, the display maps the positions of the specific object and plurality of movable bodies on the map, matches identification information of the specific object, and determines whether an image of an apparatus is showing the specific object,
wherein, if the specific object chasing function determines that the specific object is included in the image of an imaging apparatus, the image of the imaging apparatus is selected, and
wherein, if the specific object chasing function determines that the specific object is not included in the image of an imaging apparatus, the specific object chasing function estimates which imaging apparatus will show the specific object next, and selects the imaging apparatus that will show the specific object next.

11. A digital broadcast signal processing method comprising the steps of:
reading out GPS position information received from a movable body that is an object in a corresponding program;
reading out imaging area information by an imaging apparatus;
reading out GPS position information received from an imaging apparatus that is operable to acquire imaging area information concerning the corresponding program and is disposed mechanically independent of a movable body that is an object in the corresponding program; and
multiplexing GPS position information received from the movable body, GPS position information received from the imaging apparatus, the imaging area information, and mapping information indicting position information of the movable body and the imaging apparatus on a map on a digital broadcast signal of the corresponding program; and
displaying a plurality of modes and a plurality of display objects,
wherein each of the plurality of display objects is related to the selection of one of the plurality of modes,
wherein when one of the display objects is selected, the related mode is displayed,
wherein each of the plurality of display objects related to the selection of each of the plurality of modes for display purposes are all displayed simultaneously,
wherein each of the plurality of modes designated by each of a plurality of user selected display objects are displayed simultaneously, and wherein the plurality of modes comprising:
a mode for displaying a specific object chasing function,
a mode for displaying a view from a specific camera,
a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and
a mode for mapping positions of a plurality of movable bodies on the map; and
displaying a positional relationship between the movable bodies on the screen as a function of the multiplexing processing section,
wherein, when a specific object chasing function is selected, the display maps the positions of the specific object and plurality of movable bodies on the map, matches identification information of the specific object, and determines whether an image of an apparatus is showing the specific object,
wherein, if the specific object chasing function determines that the specific object is included in the image of an imaging apparatus, the image of the imaging apparatus is selected, and
wherein, if the specific object chasing function determines that the specific object is not included in the image of an imaging apparatus, the specific object chasing function estimates which imaging apparatus will show the specific object next, and selects the imaging apparatus that will show the specific object next.

12. The digital broadcast signal processing method according to claim 10, said method further comprising a step of:
multiplexing profile information concerning the movable body on the digital broadcast signal.

13. The digital broadcast signal processing method according to claim 12, wherein the profile information includes uniform resource locator (URL) information or mail address information, both being for access to information concerning the movable body.

14. A digital broadcast signal processing method comprising the steps of:
separating from a digital broadcast signal that was received or reproduced GPS position information of a movable body that is an object in a corresponding program and GPS position information of an imaging apparatus that is operable to acquire imaging area information concerning the corresponding program and is disposed mechanically independent of a movable body that is an object in the corresponding program, to map position information of the movable body and the imaging apparatus on a map on a basis of information of a map, GPS position information of the movable body and GPS position information of the imaging apparatus; and
multiplexing mapping information generated in said step on a digital broadcast signal of the corresponding program; and
displaying a plurality of modes and a plurality of display objects,
wherein each of the plurality of display objects is related to the selection of one of the plurality of modes,
wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising:

a mode for displaying a specific object chasing function, a mode for displaying a view from a specific camera, a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map; and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next.

15. A digital broadcast signal processing method comprising the steps of:

reading out profile information concerning a movable body that is an object in a corresponding program;

reading out GPS position information of an imaging apparatus that is operable to acquire imaging area information concerning the corresponding program and is disposed mechanically independent of a movable body that is an object in the corresponding program; and multiplexing the profile information concerning the movable body, the GPS position information of the movable body, and mapping information indicting position information of the movable body on a map on a digital broadcast signal; and displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising:

a mode for displaying a specific object chasing function, a mode for displaying a view from a specific camera, a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map; and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next.

16. The digital broadcast signal processing method according to claim 15, wherein position information of the movable body that is the object, mapping information generated by mapping of the position information of the movable body that is the object and/or position information of an imaging apparatus on a map, imaging area information by the imaging apparatus and object information by the imaging apparatus is multiplexed on the digital broadcast signal.

17. The digital broadcast signal processing method according to claim 15, wherein said profile information includes uniform resource locator (URL) information or mail address information for access to information concerning the movable body.

18. A digital broadcast signal processing method comprising the processes of:

multiplexing on a picture signal GPS position information received from a movable body that is an object in a corresponding program, GPS position information received from an imaging apparatus that is operable to acquire imaging area information concerning the corresponding program and is disposed mechanically independent of a movable body that is an object in the corresponding program, and mapping information indicting position information of the movable body and the imaging apparatus on a map; and transmitting the picture signal after the multiplexing process as a digital broadcast signal; and displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising: a mode for displaying a specific object chasing function, a mode for displaying a view from a specific camera, a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map; and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next.

19. A digital broadcast signal processing method comprising the processes of:

multiplexing on a picture signal GPS position information of a movable body that is an object in a corresponding program, GPS position information of an imaging apparatus that is operable to acquire imaging area information concerning the corresponding program and is disposed mechanically independent of a movable body that is an object in the corresponding program, imaging area information by the imaging apparatus, and mapping information indicting position information of the movable body and the imaging apparatus on a map; and transmitting the picture signal after the multiplexing process as a digital broadcast signal; and displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising:

a mode for displaying a specific object chasing function, a mode for displaying a view from a specific camera, a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map; and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next.

20. A digital broadcast signal processing method comprising the processes of:

multiplexing on a picture signal mapping information generated by mapping on a map position information of a movable body that is an object in a corresponding program and position information of an imaging apparatus that is operable to acquire imaging area information concerning the corresponding program and is disposed mechanically independent of a movable body that is an object in the corresponding program on a basis of information of a map, GPS position information received from the movable body and GPS position information received from the imaging apparatus; and transmitting the picture signal after the multiplexing process as a digital broadcast signal; and displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising:

a mode for displaying a specific object chasing function, a mode for displaying a view from a specific camera, a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map; and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, and wherein, if the specific object chasing function determines that the specific object is included in the image of an imaging apparatus, the image of the imaging apparatus is selected, wherein, if the specific object chasing function determines that the specific object is not included in the image of an imaging apparatus, the specific object chasing function estimates which imaging apparatus will show the specific object next, and selects the imaging apparatus that will show the specific object next.

21. A digital broadcast signal processing method comprising the processes of:

multiplexing on a picture signal profile information concerning a movable body that is an object in a corresponding program, GPS position information of an imaging apparatus that is operable to acquire imaging area information concerning the corresponding program and is disposed mechanically independent of a movable body that is an object in the corresponding program, and mapping information indicting position information of the movable body and the imaging apparatus on a map; and transmitting the picture signal after the multiplexing process as a digital broadcast signal; and displaying a plurality of modes and a plurality of display objects, wherein each of the plurality of display objects is related to the selection of one of the plurality of modes, wherein when one of the display objects is selected, the related mode is displayed, wherein each of the plurality of display objects related to the selection of each of the plurality of modes for display purposes are all displayed simultaneously, wherein each of the plurality of modes designated by each of a plurality of user selected display objects are displayed simultaneously, and wherein the plurality of modes comprising: a mode for displaying a specific object chasing function, a mode for displaying a view from a specific camera, a mode for displaying specific profile information and for displaying the specific profile information hierarchically, such that when an operation input requesting the disclosure of more detailed information of an item on the screen is input, the requested information linked to the item displayed on the screen in a same location as the selection occurred, and a mode for displaying, hierarchically, a URL related to each movable body embedded in the profile information providing access to a database comprising a web image displayed for a divided screen, wherein the web image is obtained only by selecting the URL, and a mode for mapping positions of a plurality of movable bodies on the map; and displaying a positional relationship between the movable bodies on the screen as a function of the multiplexing processing section, wherein, when a specific object chasing function is selected, the display maps the positions of the specific object and plurality of movable bodies on the map, matches identification information of the specific object, and determines whether an image of an apparatus is showing the specific object, wherein, if the specific object chasing function determines that the specific object is included in the image of an imaging apparatus, the image of the imaging apparatus is selected, and wherein, if the specific object chasing function determines that the specific object is not included in the image of an imaging apparatus, the specific object chasing function estimates which imaging apparatus will show the specific object next, and selects the imaging apparatus that will show the specific object next, and displays an image of an imaging apparatus mounted on the specific object when the specific object is not a subject of the plurality imaging apparatuses.

* * * * *